United States Patent
Belknap

(10) Patent No.: US 12,286,571 B2
(45) Date of Patent: Apr. 29, 2025

(54) ADHESIVE TAPE WITH EXTENDED LINER TAB AND APPARATUS AND METHOD OF MAKING SAME

(71) Applicant: 3M INNOVATIVE PROPERTIES COMPANY, St. Paul, MN (US)

(72) Inventor: Benjamin D. Belknap, Northville, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 408 days.

(21) Appl. No.: 17/638,889

(22) PCT Filed: Aug. 28, 2020

(86) PCT No.: PCT/IB2020/058068
§ 371 (c)(1),
(2) Date: Feb. 28, 2022

(87) PCT Pub. No.: WO2021/038522
PCT Pub. Date: Mar. 4, 2021

(65) Prior Publication Data
US 2022/0306912 A1    Sep. 29, 2022

Related U.S. Application Data

(60) Provisional application No. 62/893,894, filed on Aug. 30, 2019.

(51) Int. Cl.
*C09J 7/40*     (2018.01)
*B26D 1/00*    (2006.01)
(Continued)

(52) U.S. Cl.
CPC ............ *C09J 7/403* (2018.01); *B26D 1/0006* (2013.01); *B26D 1/045* (2013.01); *B26D 3/085* (2013.01);
(Continued)

(58) Field of Classification Search
CPC . C09J 7/403; C09J 7/26; C09J 2301/18; C09J 2301/204; C09J 7/10; B26D 1/0006;
(Continued)

(56) References Cited

U.S. PATENT DOCUMENTS 7,093,641 B2    8/2006    Sharp et al.
8,397,784 B2    3/2013    Stoll et al.
(Continued)

FOREIGN PATENT DOCUMENTS

EP    2712901 A1    4/2014
GB    2218682 A    11/1989
(Continued)

OTHER PUBLICATIONS

International Search report for PCT International Application No. PCT/IB2020/058068 mailed on Apr. 12, 2020, 5 pages.

*Primary Examiner* — Christopher W Raimund
(74) *Attorney, Agent, or Firm* — Carlos M. Téllez Rodríguez; 3M Innovative Properties Co

(57) ABSTRACT

Adhesive tape with an extended liner tab. A method of making a tape with an extended liner tab, by (A) providing a release liner-backed double-sided adhesive tape; (B) isolating a tape slug from the adhesive tape; (C) removing the tape slug so as to expose an underlying length of the release liner; and (D) cutting through the release liner so as to form the extended liner tab. Apparatus for performing the method, and release liner-backed double-sided adhesive tape comprising a plurality of spaced apart finite lengths of an adhesive tape and a release liner, with an exposed length of release liner disposed between adjacent lengths of adhesive tape.

6 Claims, 14 Drawing Sheets

(51) Int. Cl.
  *B26D 1/04* (2006.01)
  *B26D 3/08* (2006.01)
  *B26D 5/12* (2006.01)
  *B26D 7/18* (2006.01)
  *C09J 7/26* (2018.01)

(52) U.S. Cl.
  CPC .............. *B26D 7/1836* (2013.01); *C09J 7/26* (2018.01); *B26D 2001/0066* (2013.01); *B26D 5/12* (2013.01); *C09J 2301/18* (2020.08); *C09J 2301/204* (2020.08)

(58) Field of Classification Search
  CPC ...... B26D 1/045; B26D 3/085; B26D 7/1836; B26D 5/12; B26D 2001/0066
  See application file for complete search history.

(56) References Cited

U.S. PATENT DOCUMENTS

| | | | |
|---|---|---|---|
| 2005/0084641 A1 | 4/2005 | Downs et al. | |
| 2014/0252021 A1* | 9/2014 | Himmelsbach | B41J 3/4075 221/30 |

FOREIGN PATENT DOCUMENTS

| | | | |
|---|---|---|---|
| JP | H08-133560 A * | 5/1996 | |
| WO | 2001044397 A1 | 6/2001 | |

* cited by examiner

ADHESIVE TAPE WITH EXTENDED LINER TAB AND APPARATUS AND METHOD OF MAKING SAME

CROSS REFERENCE TO RELATED APPLICATIONS

This application is a national stage filing under 35 U.S.C. 371 of PCT/IB2020/058068, filed Aug. 28, 2020, which claims the benefit of Provisional Application No. 62/893,894, filed Aug. 30, 2019, the disclosure of each of which is incorporated by reference in their entirety herein.

The present invention relates to release liner protected adhesive tapes, and in particular to release liner-backed double-sided adhesive tape with an extended liner tab, including apparatus and methods for forming an extended liner tab on the release liner of adhesive tape.

BACKGROUND

Release liners have been used to protect the adhesive surface of adhesive tapes, including double-sided adhesive tapes. It can be difficult to initiate the removal of a release liner used on adhesive tapes. Extending an edge of a release liner beyond the corresponding edge of the underlying adhesive tape can make it easier to initiate the removal of the release liner. In the past, release liners have been so extended by having a separate tab adhered to the release liner such that the tab can be easily grabbed by hand and pulled so as to initiate the removal of the release liner.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

The present invention is directed to a release liner backed double-sided adhesive tape having a more cost effectively provided extended liner tab for initiating the removal of the release liner from the adhesive tape.

In one aspect of the present invention, a method is provided for making at least one length of a release liner-backed double-sided adhesive tape having an extended liner tab. The method includes providing a liner-backed double-sided adhesive tape comprising an adhesive tape having a free end and opposite sides, with each of the opposite sides having a major surface of adhesive, a release liner protecting one major surface of adhesive, and the other major surface of adhesive being exposed. The method also includes forming a tape slug by isolating a tape slug from the adhesive tape, with the tape slug having a slug length equal to or greater than the tab length of the extended liner tab to be formed; removing the tape slug so as to expose an underlying length of the release liner and form a remaining length of the adhesive tape, with the underlying length of the release liner having opposite ends; and cutting through the release liner at one of the opposite ends or at some point between the opposite ends of the underlying length of the release liner so as to form the extended liner tab. The extended liner tab has a tab length equal to or less than the slug length.

In another aspect of the present invention, an apparatus is provided for automatically forming an extended liner tab at a location on, or at multiple spaced apart locations along, a liner-backed double-sided adhesive tape, with the liner-backed double-sided adhesive tape including an adhesive tape having opposite sides, with each side having a major surface of adhesive, a release liner protecting one major surface of adhesive, and the other major surface of adhesive being exposed. The apparatus includes a tape moving assembly operatively adapted for a) moving a length of the liner-backed double-sided adhesive tape along a path and periodically stopping such movement to permit the formation of a tape slug, or b) moving a length of the liner-backed double-sided adhesive tape to a tape slug forming location to permit the formation of a tape slug. The apparatus also includes a tape slug forming assembly operatively adapted for cutting through the adhesive tape at a location, without cutting through the release liner and for cutting through the adhesive tape at another location spaced along the adhesive tape from the one location so as to form the tape slug, with the tape slug having a slug length equal to or greater than the tab length of the extended liner tab to be formed. In addition, the apparatus includes a tape slug removal assembly operatively adapted for removing the tape slug from a remaining length of the adhesive tape so as to expose an underlying length of the release liner, with the underlying length of the release liner having opposite ends.

In an additional aspect of the present invention, a length of liner-backed double-sided adhesive tape is provided that includes a plurality of spaced apart lengths of an adhesive tape and a release liner, with each length of adhesive tape having opposite sides, each side having a major surface of adhesive, and one major surface of adhesive on one side of each length of adhesive tape being protected by said release liner, wherein an exposed length of said release liner is disposed between adjacent lengths of said adhesive tape.

These and other aspects, features and/or advantages of the invention are further shown and described in the drawings and detailed description herein, where like reference numerals may be used to represent similar parts. It is to be understood, however, that the drawings and description are for illustration purposes only and should not be read in a manner that would unduly limit the scope of this invention.

The above summary of the present invention is not intended to describe each disclosed embodiment or every implementation of the present invention. The description that follows more particularly exemplifies illustrative embodiments. In several places throughout the application, guidance is provided through exemplary examples, which examples can be used in various combinations. In each instance, the recited list serves only as a representative group and should not be interpreted as an exclusive list.

DETAILED DESCRIPTION OF CERTAIN EMBODIMENTS

In describing certain embodiments of the invention, specific terminology is used for the sake of clarity. The invention, however, is not intended to be limited to the specific terms so selected, and each term so selected includes all technical equivalents that operate similarly. In addition, reference numbers used to identify an element of one embodiment may be used to identify a similar but different element of another embodiment.

The terms "comprises", "includes" and variations thereof do not have a limiting meaning where these terms appear in the description and claims.

As used herein, "a", "an", "the", "at least one", and "one or more" encompass embodiments having plural referents and are used interchangeably, unless the content clearly dictates otherwise. Thus, for example, making "at least one" length of a liner-backed double-sided adhesive tape having an extended liner tab can be interpreted to mean making only one length of such a tape or making such lengths of such tape.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitation of numerical ranges by endpoints includes all numbers subsumed within that range in increments commensurate with the degree of accuracy indicated by the end points of the specified range (e.g., for a range of from 1.000 to 5.000, the increments will be 0.001, and the range will include 1.000, 1.001, 1.002, etc., 1.100, 1.101, 1.102, etc., 2.000, 2.001, 2.002, etc., 2.100, 2.101, 2.102, etc., 3.000, 3.001, 3.002, etc., 3.100, 3.101, 3.102, etc., 4.000, 4.001, 4.002, etc., 4.100, 4.101, 4.102, etc., 5.000, 5.001, 5.002, etc. up to 5.999) and any range within that range, unless expressly indicated otherwise.

Figure 1:
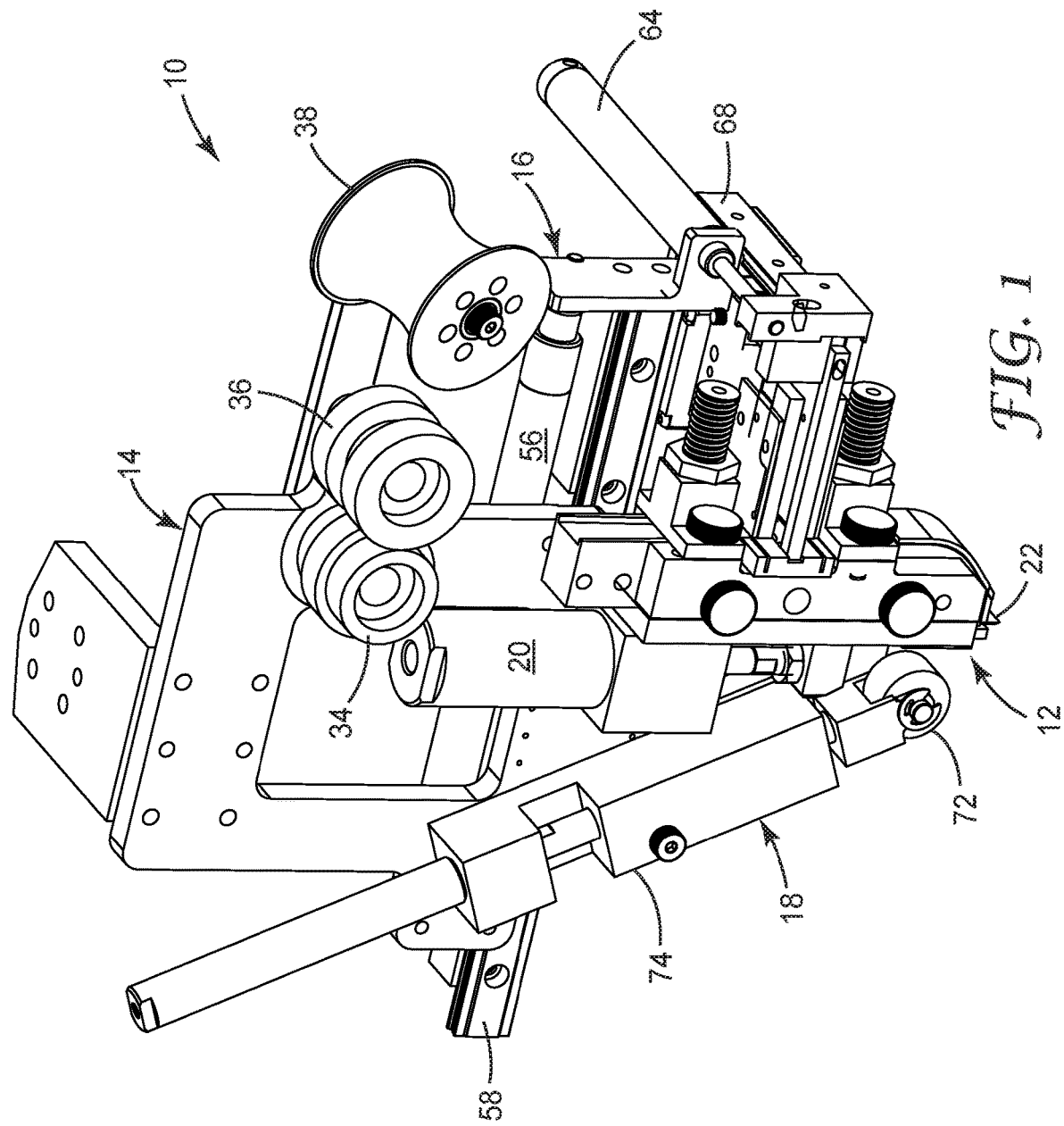
FIG. 1 is a side perspective view of an apparatus for automatically forming an extended liner tab at spaced apart locations along a continuous length of adhesive tape and applying, one at a time, each of multiple individual lengths of adhesive tape to a substrate surface, with each length of tape having an extended liner tab, in accordance with one embodiment of the present invention.

In the embodiment of FIG. 1, the apparatus 10 comprises a third blade actuating mechanism 12, an adhesive tape moving assembly 14, an adhesive tape slug forming and removing assembly 16, and a tape application assembly 18. The apparatus 10 automatically forms an extended liner tab 11 at spaced apart locations along a continuous length of double-sided adhesive tape 13, with a release liner backing/protecting one adhesive side and the other adhesive side being exposed. The apparatus applies, one at a time, each of multiple individual lengths 15 of the adhesive tape 13 to a desired substrate surface 17, with an extended liner tab 11 being located on at least one end of each length of tape 15.

Figure 1A:
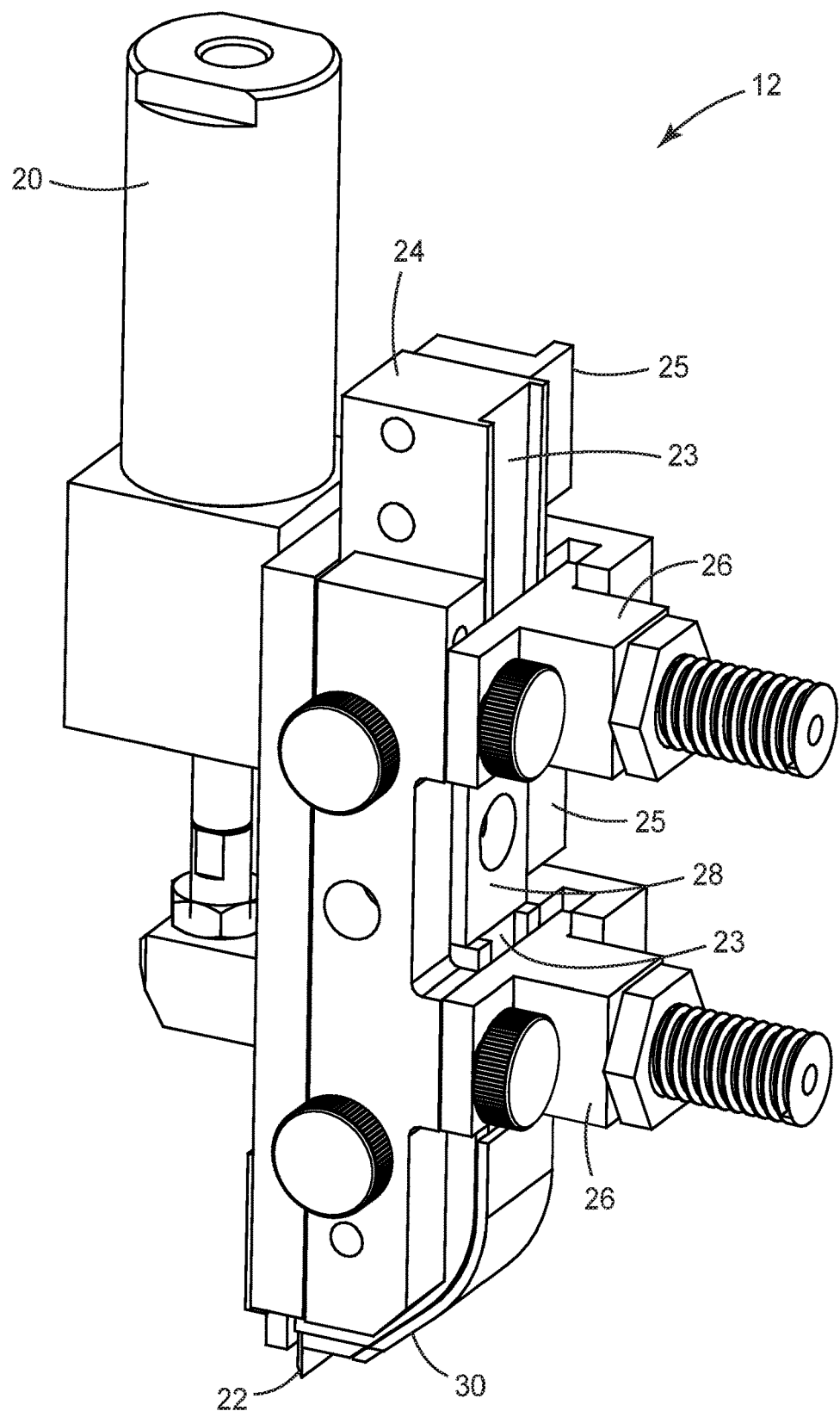
FIG. 1A is a side perspective view of a third blade actuating mechanism, of the apparatus of FIG. 1, for moving a cutting blade so as to cut through the underlying length of release liner, after the adhesive tape slug is removed therefrom.
Figure 1B:
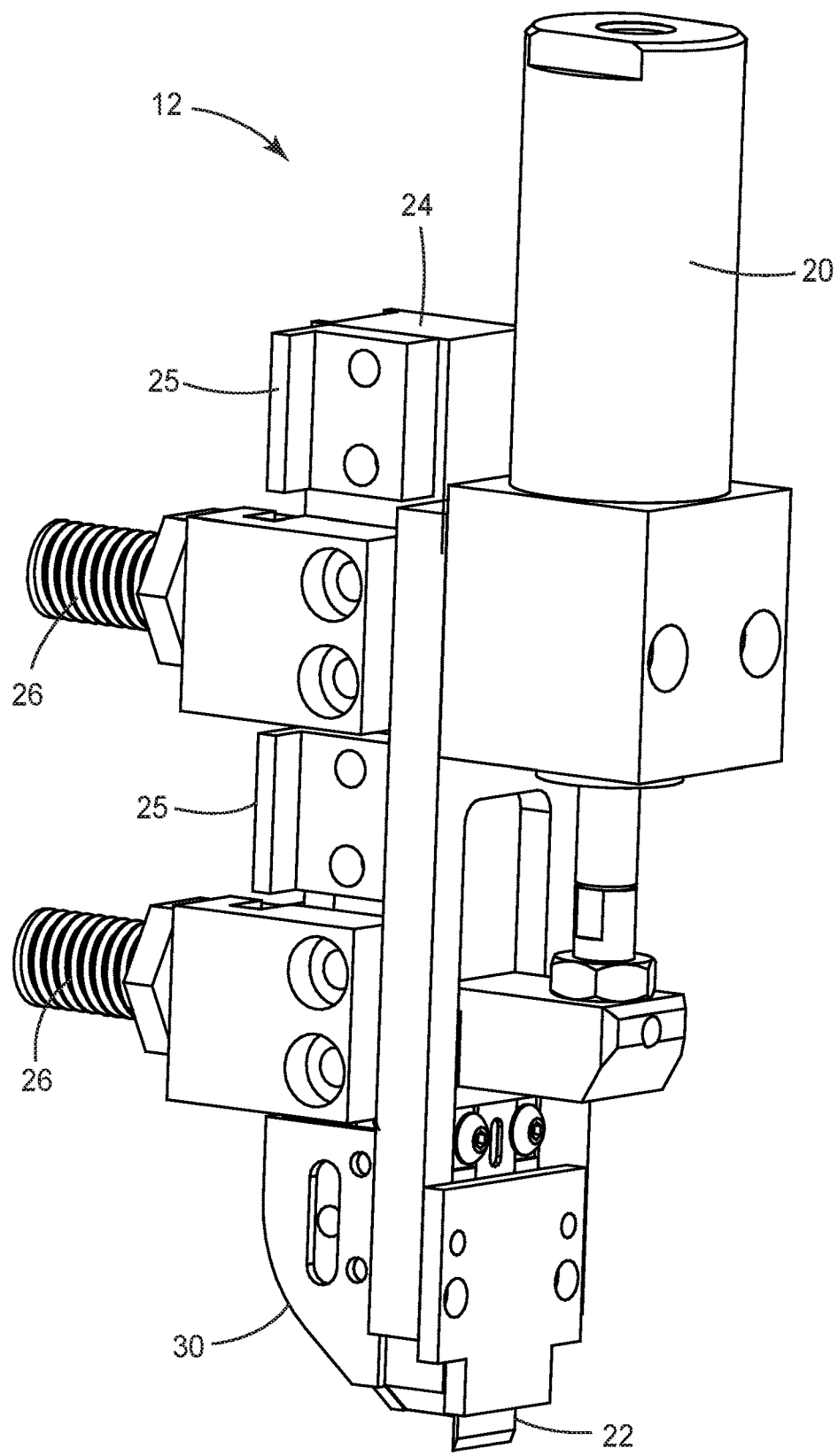
FIG. 1B is an opposite side perspective view of the third blade actuating mechanism of FIG. 1A.

In the embodiment of FIGS. 1A and 1B, the third blade actuating mechanism 12 comprises a blade actuating pneumatic cylinder 20 for moving a third cutting blade 22 into an extended cutting position (e.g., down) and a retracted position (e.g., up). The blade 22 is used to cut through the underlying length of release liner 19, after an adhesive tape slug 21 is removed therefrom.

Included with the mechanism 12, and forming part of the adhesive tape moving assembly 14, is an aluminum tape guiding head 24 having a channel 23 along which the liner side of the tape 13 slides, and a pair of tape head spacers 25. A shoe cover plate 30 covers the lower length of the tape path channel 23 up to where the channel 23 opens to the cutting blade 22.

A pair of spaced apart pneumatic cylinder actuated tape engaging clamps 26, forming part of the adhesive tape slug forming and removing assembly 16, are used for holding the tape 13 in place during the slug forming and removing operation. An A2 RC58-62 cut plate 28 is provided for backing the adhesive tape 13 during the slug forming operation. The clamps 26 are thereafter actuated away from the tape 13 to release and allow downstream movement of the tape 13 so the resulting underlying length of release liner 19 can be cut to form the corresponding extended liner tab 11.

Figure 1C:
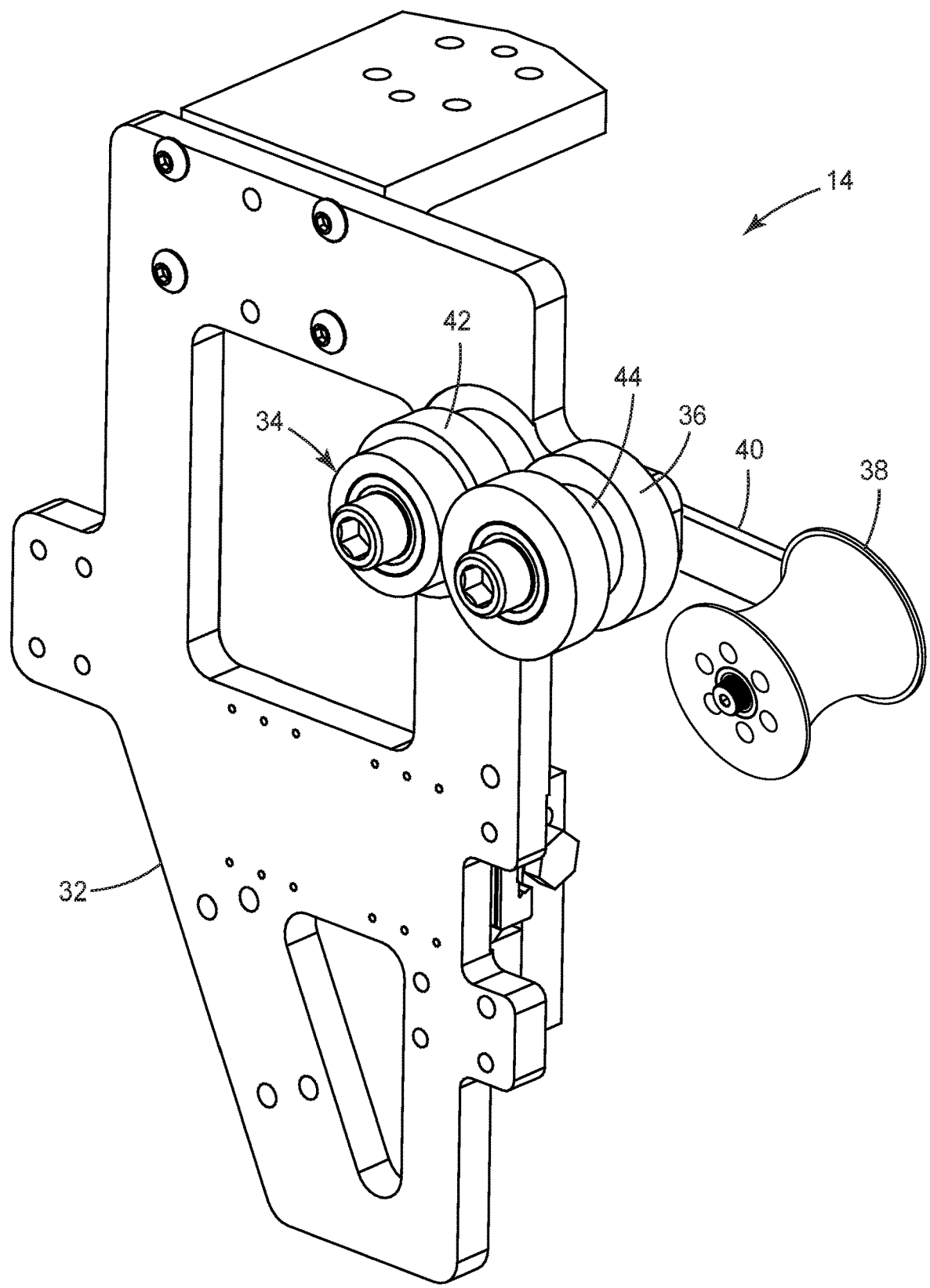
FIG. 1C is a side perspective view of an adhesive tape moving assembly, of the apparatus of FIG. 1, for at least moving a continuous length of the adhesive tape.
Figure 1D:
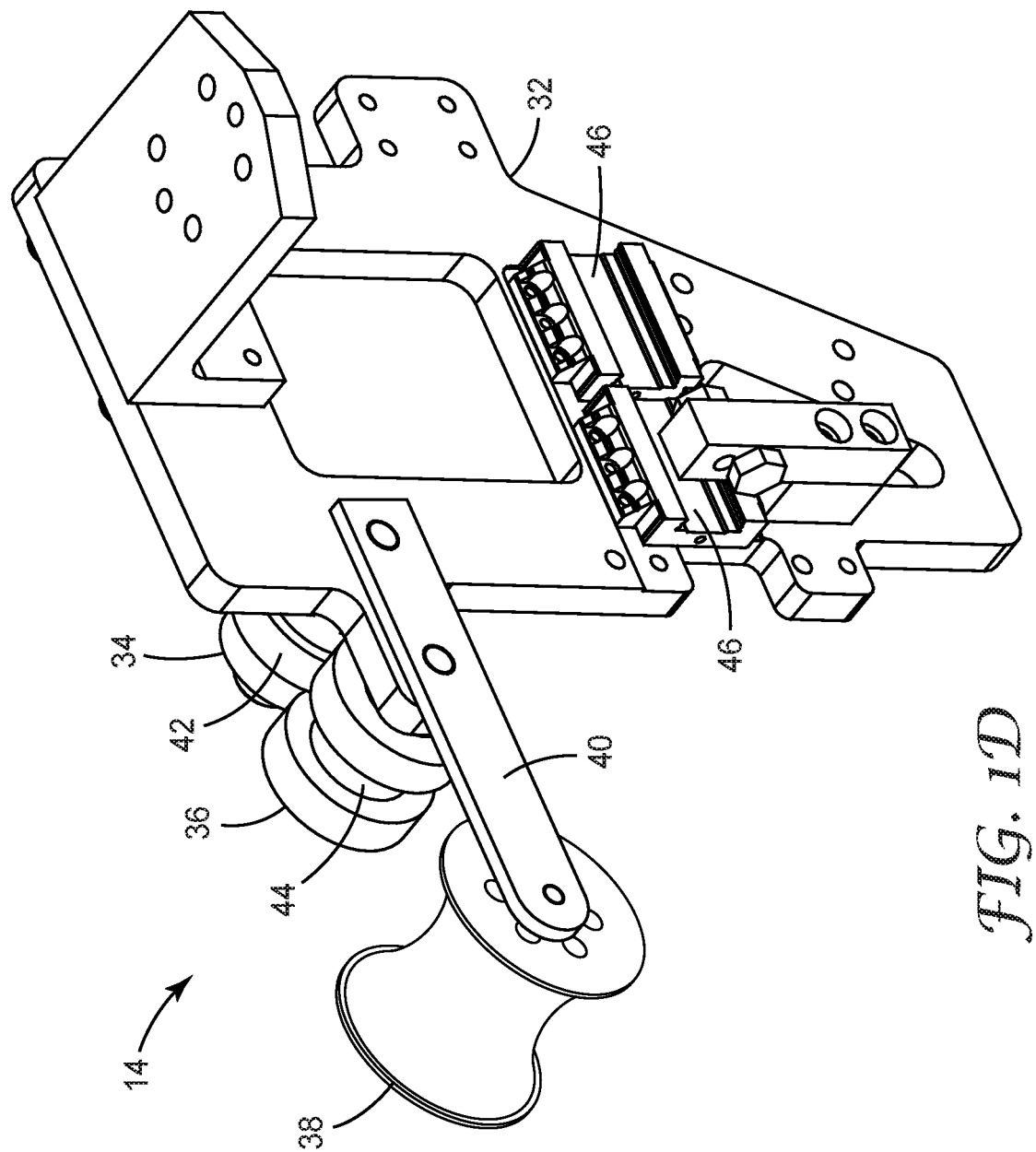
FIG. 1D is an opposite side perspective view of the adhesive tape moving assembly of FIG. 1C.

In the embodiment of FIGS. 1C and 1D, the adhesive tape moving assembly 14 includes a frame 32 mounting a pair of tape engaging rollers 34 and 36, along with a tape guide roller 38 mounted on the end of an extension arm 40. The engaging roller 34 includes an annular ridge 42 that fits within a mating annular grove 44 so as to sandwich the adhesive tape 13 in a gap formed between the rollers 34 and 36, while the tape 13 passes therethrough. The exposed adhesive side of the tape 13 contacts the surface of the guide roller 38. It may be desirable to drive one or both of the rollers 34 and 36, e.g., with a motor (not shown). A pair of bearing blocks 46 are mounted on the back side of the frame 32 and form part of the adhesive tape slug forming and removing assembly 16.

Figure 1E:
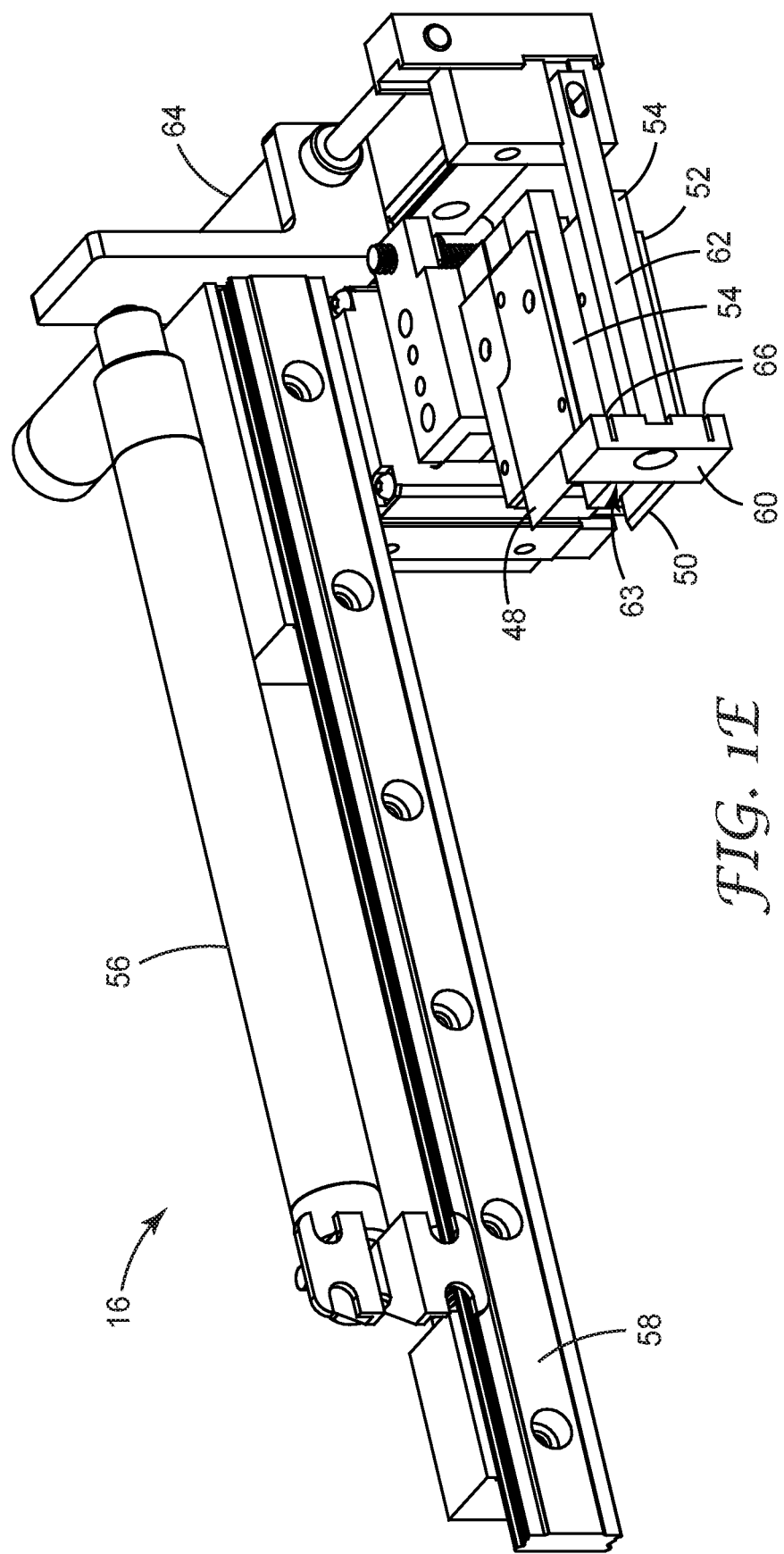
FIG. 1E is a side perspective view of an adhesive tape slug forming and removing assembly, of the apparatus of FIG. 1, for forming and then removing the adhesive tape slug from an underlying length of release liner of the adhesive tape.
Figure 1F:
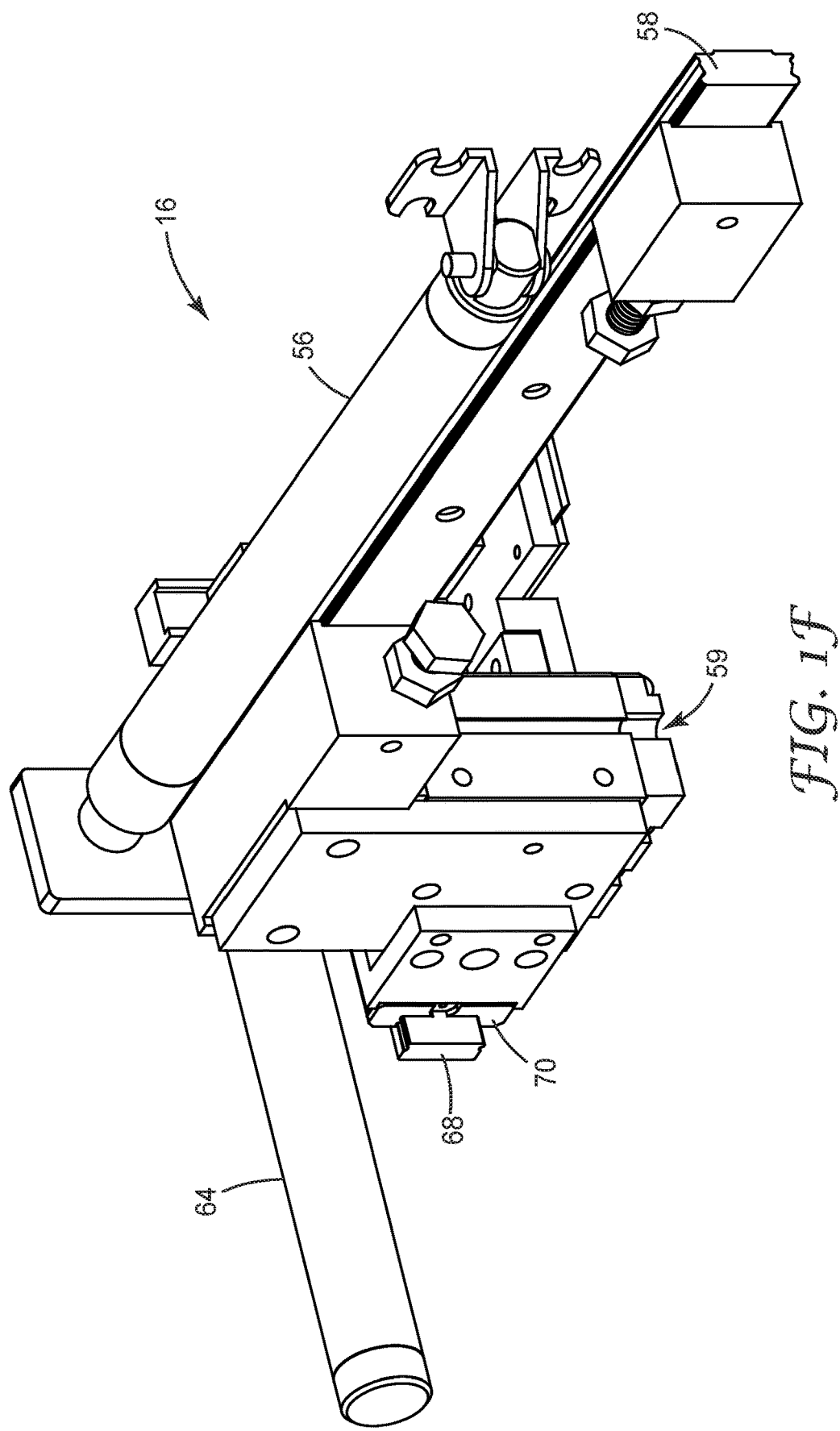
FIG. 1F is an opposite side perspective view of the adhesive tape slug forming and removing assembly of FIG. 1E.

In the embodiment of FIGS. 1E and 1F, the adhesive tape slug forming and removing assembly 16 includes spaced apart first and second cutting blades 48 and 50 that are each mounted between a blade cover 52 and a gripper blade holder 54. The opposing gripper blade holders 54, and thereby the blades 48 and 50, are mounted to a pneumatic cylinder 56 so that, during the slug forming operation, the blades 48 and 50 are movable toward the cut plate 28 so as to kiss cut through the adhesive tape 13, without cutting through the underlying release liner 19, and thereby form an adhesive tape slug 21 therebetween. While in this position, each freshly cut adhesive edge on either end of the slug 21 is adhesively bonded to the inner side of its corresponding cutting blade. The cylinder 56 is mounted to a linear rail 58, which is mounted within and slidable along the pair of bearing blocks 46 mounted on the frame 32.

The opposing gripper blade holders 54, and thereby the blades 48 and 50, are also slightly movable toward and away from each other using a pneumatic gripper 59 (e.g., a Schunk Gripper ID 1343463-MPC 040). In this way, during the slug removal process, the blades 48 and 50 are moved toward each other in a pinching or gripping motion that flexes the adhesive tape slug 21 therebetween and causes the slug 21 to begin peeling off, or completely peel off, of the underlying release liner 19. Contemporaneous with this pinching/gripping action, the air cylinder 56 also moves the blades 48 and 50 away from the cut plate 28 and may assist in removing the slug 21 off of the underlying release liner 19 (see FIG. 2A). The preceding slug removal process can be performed once or multiple times resulting in a stack of slugs 21 between the blades 48 and 50.

The assembly 16 also includes a feature for discarding the one or more slugs 21 from between the blades 48 and 50. A slug stripper block 60 is mounted on the end of a stripper arm 62 that is movable by an air cylinder 64. The cylinder 64 is mounted to a linear rail 68, which is mounted within and slidable along a bearing block 70. Before the cylinder 64 is actuated, the block 60 begins at a starting position, where the leading edge 63 of the block 60 is outbound on one side of the cutting blades 48 and 50 and in line with the tape slug 21. As the cylinder is actuated, the block 60 moves widthwise across to the other side of the cutting blades 48 and 50, makes contact with the side edge of the tape slug, and strips off the tape slug 21 from between the blades 48 and 50. The block 60 is then moved widthwise back across to the one side of the blades 48 and 50. The stripper block 60 includes upper and lower slots 66 that are spaced apart, lined up with the cutting blades 48 and 50 and dimensioned, so that during this widthwise movement of the stripping block 60, each of the blades 48 and 50 passes through its corresponding slot 66. In this way, the one or more slugs 21 are stripped off from between the blades 48 and 50, when the block 60 is moved from one side to the other of the blades 48 and 50. The removed slug(s) 21 can then be discarded.

The tape application assembly 18 embodiment of FIG. 1 also includes a pressure applying roller 72 actuated by an air cylinder 74 for applying pressure to the liner side back of the individual length 15 of tape as the tape 15 is applied to the substrate surface 17. The roller 72 is retracted after the individual length 15 of tape is applied and the underlying length of release liner 19 is cut to form its extended liner tab 11.

Figure 2:
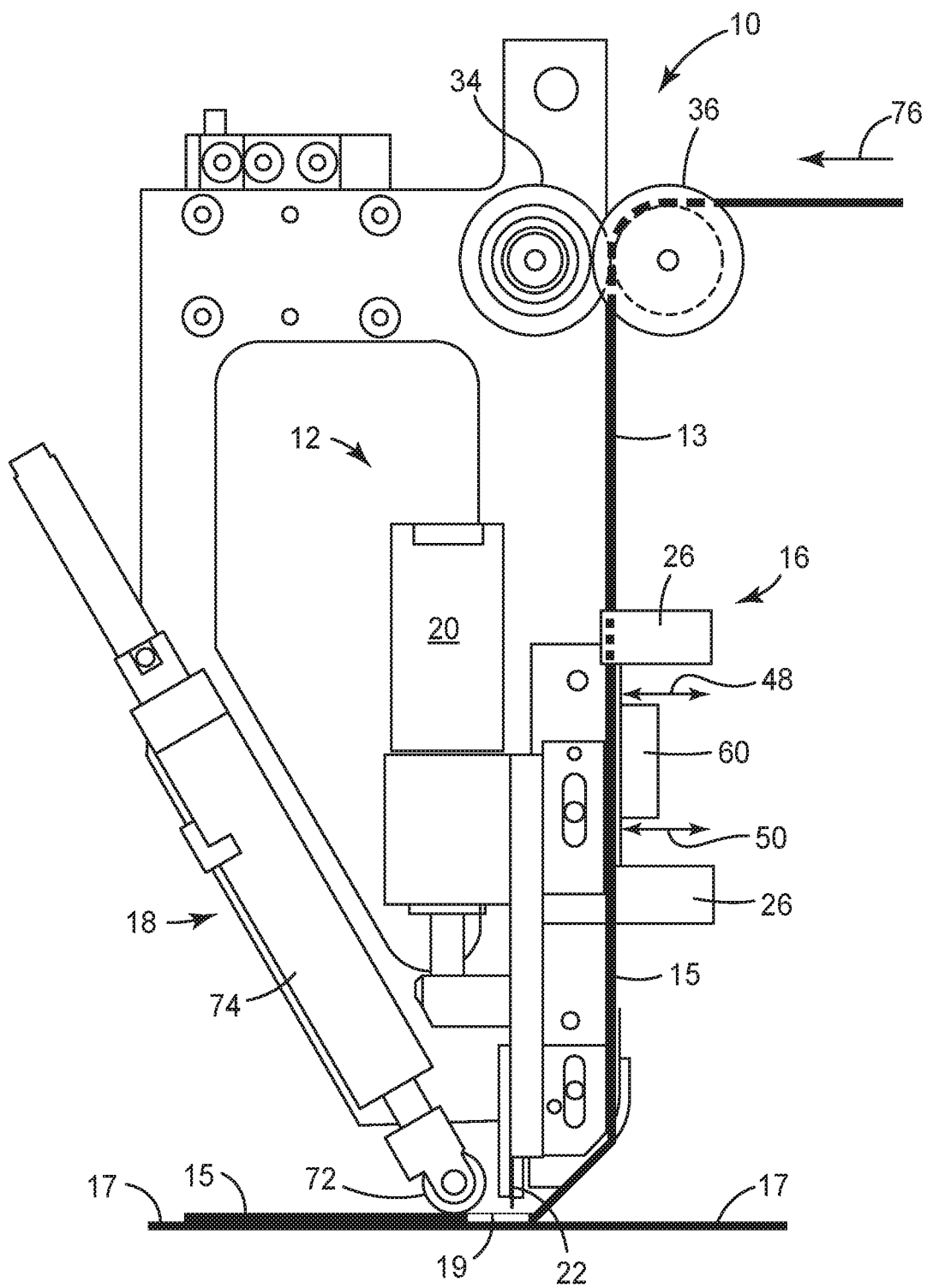
FIG. 2 is a schematic side view of one apparatus used in accordance with one method embodiment of the present invention.
Figure 2A:
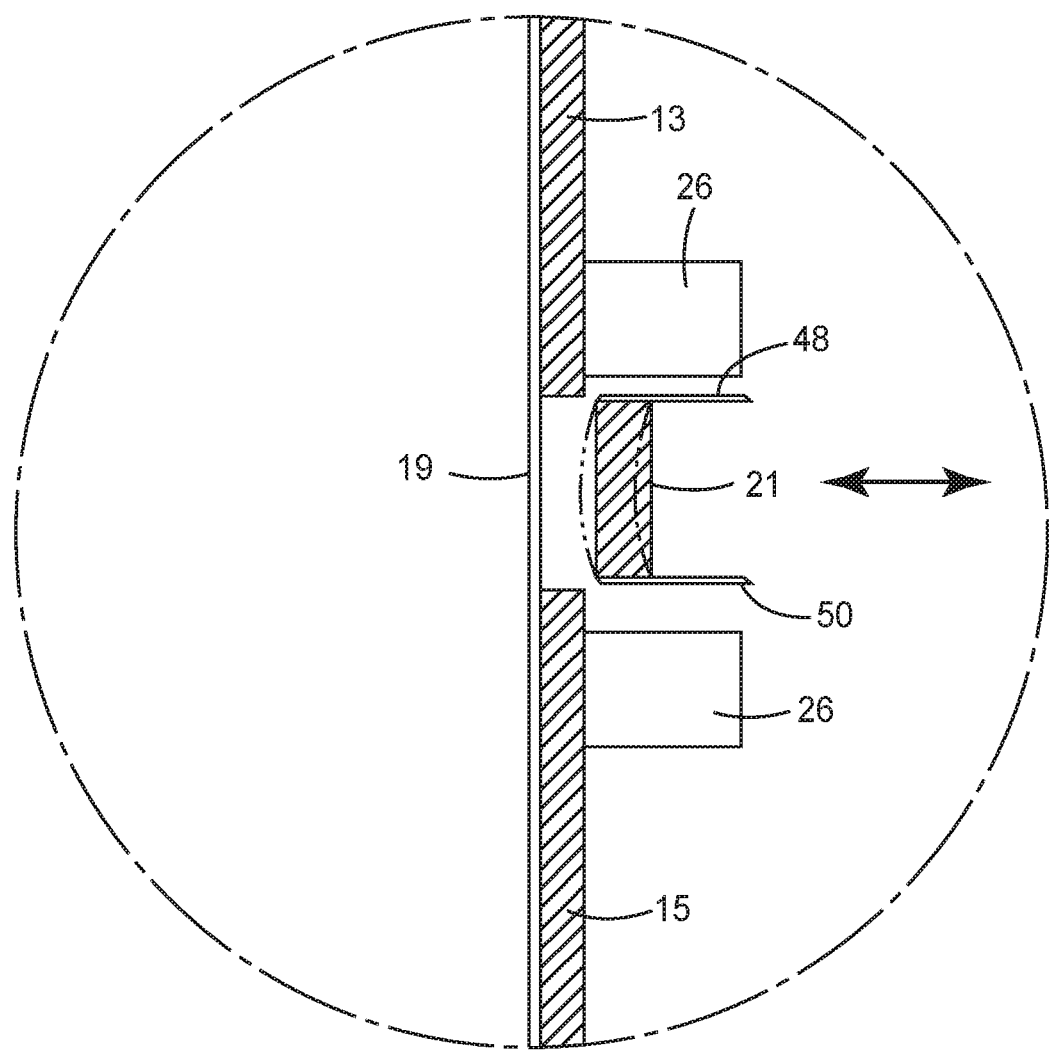
FIG. 2A is an enlarged schematic view of the slug forming area of the adhesive tape slug forming and removing assembly of FIG. 2.

In the method embodiment of FIGS. 2 and 2A, a tape applicator 10 is used to automatically form an extended liner tab 11 at spaced apart locations along a continuous length of release liner-backed double-sided adhesive tape 13 and applying, one at a time, each of multiple individual lengths 15 of the tape to a substrate surface 17, with each length of tape 15 having an extended liner tab 11. The direction of movement of the tape 13 through the applicator 10 is indicated by the arrow 76. In this method, the tape 13 passes through a pair of rollers 34 and 36 and into an adhesive tape slug forming and removing assembly 16, until a desired length 15 of the tape 13 passes through the assembly 16. At that point, the progression of the tape 13 is stopped, the tape 13 is held in place by a pair of spaced apart clamping devices 26, with one clamp 26 on either side of a pair of spaced apart first and second cutting blades 48 and 50. The blades 48 and 50, which are respectively represented by numbered arrows, are moved to kiss cut through the tape 13, without cutting through the underlying release liner 19, and thereby form an adhesive tape slug 21 therebetween (see FIG. 2A). The blades 48 and 50 are then moved toward each other, in a direction perpendicular to the numbered arrows, in a motion that pinches or otherwise grips and flexes the adhesive tape slug 21 therebetween (see the phantom lines of slug 21 in FIG. 2A) and causes the slug 21 to begin peeling off, or completely peel off, of the underlying release liner 19. After or contemporaneous with this gripping action, the blades 48 and 50 are moved away from the portion of release liner 19 on which the slug 21 was located (see FIG. 2A). After the slug 21 is removed from the liner 19, the exposed adhesive surface of the leading end of the length of tape 15 is pressure contacted so as to adhere to a surface of a substrate 17 by pressing the corresponding liner side of the tape 15 with a roller 72 actuated by an actuator 74 of a tape application assembly 18. Thereafter, one or the other or both of the applicator 10 or substrate 17 are moved past each other, while the roller 72 continues to apply pressure, until all of the length of tape 15 is adhered to the substrate surface 17 and then stops moving when the trailing end of the underlying release liner 19 is in line with a third cutting blade 22 of a third blade actuating mechanism 12. At that point an actuator 20 of the mechanism 12 moves the blade 22 so as to cut through the release liner 19 and form an extended liner tab 11.

The preceding slug removal process can be performed once or multiple times resulting in a stack of slugs 21 being accumulated between the blades 48 and 50. The assembly 16 also includes a stripper feature 60 for discarding the one or more slugs 21 from between the blades 48 and 50. The slug stripper feature 60 grabs or otherwise contacts the slug(s) 21 and moves so as to strip off the tape slug(s) 21 from between the blades 48 and 50. The removed slug(s) 21 are then be discarded. The feature 60 is then moved back to a position that does not impede or interfere with the operation of the blades 48 and 50 in continuing to form tape slugs 21 and lengths of tape 15 with an extended liner tab 11.

Figure 3:
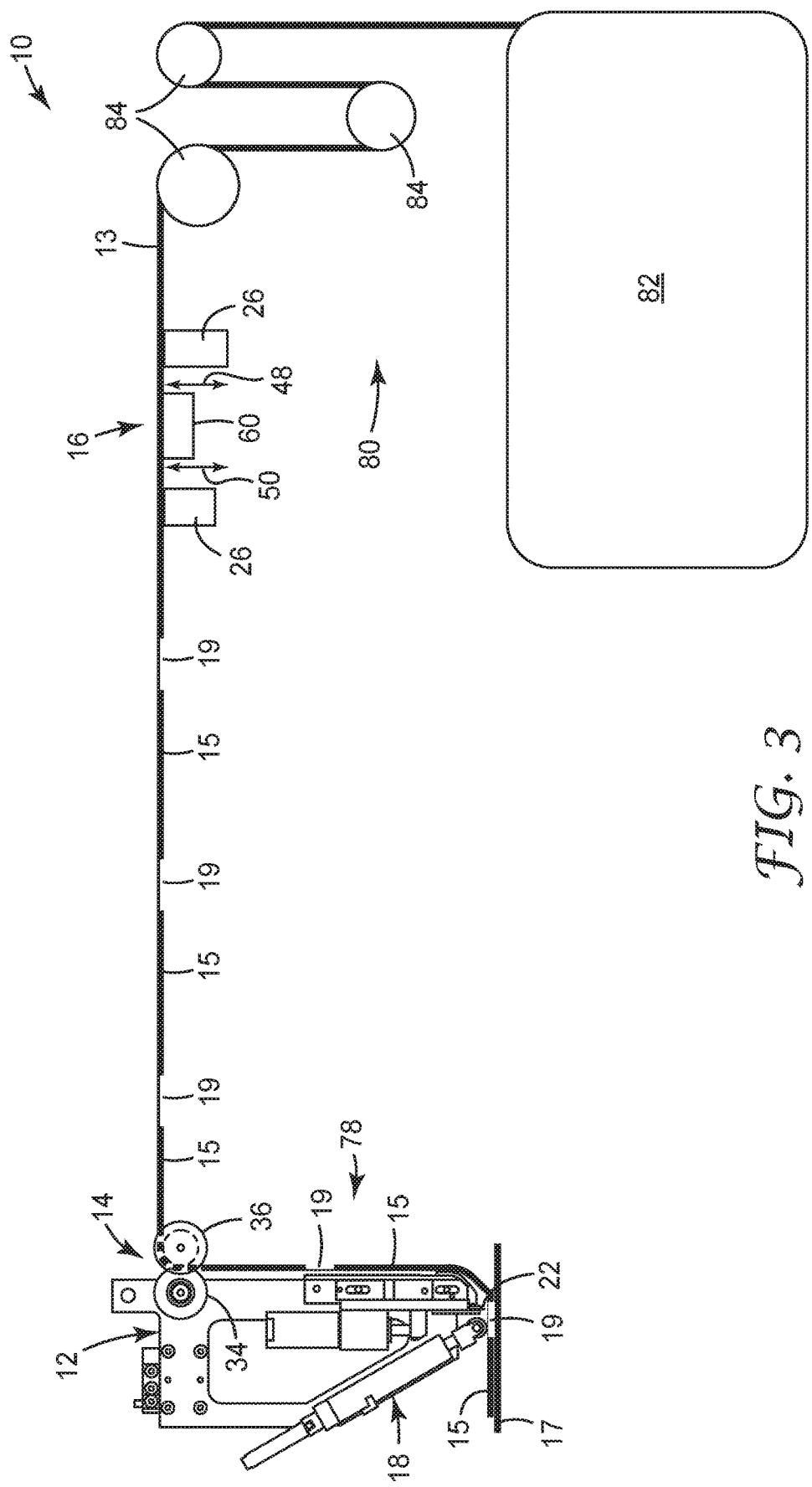
FIG. 3 is a schematic side view of another apparatus used in accordance with another method embodiment of the present invention.

The method embodiment of FIG. 3 is similar to that of FIG. 2 except that the adhesive tape slug forming and removing assembly 16 used in the method is separate from the third blade actuating mechanism 12, adhesive tape moving assembly 14, and tape application assembly 18 of a tape application head 78. The apparatus 10 also includes an adhesive tape unwind station 80 or other source containing a spool of the tape 13. On its way to the application head 78, the tape 13 leaves the source 89, passes through a plurality of tension control rollers 84 (e.g., 3) and into the assembly 16. Once the location for an extended liner tab 11 is reached, forward movement of the tape 13 is stop and a tape slug 21 is formed and removed as previously described. The downstream progress of the tape 13 is continued, with multiple tape lengths 15 and corresponding exposed liner portions 19 being located between the assembly 16 and the application head 78. The tape lengths 15 are applied to the desired substrate 17 and the liner portions 19 are converted into tabs 11, as previously described.

Figure 4:
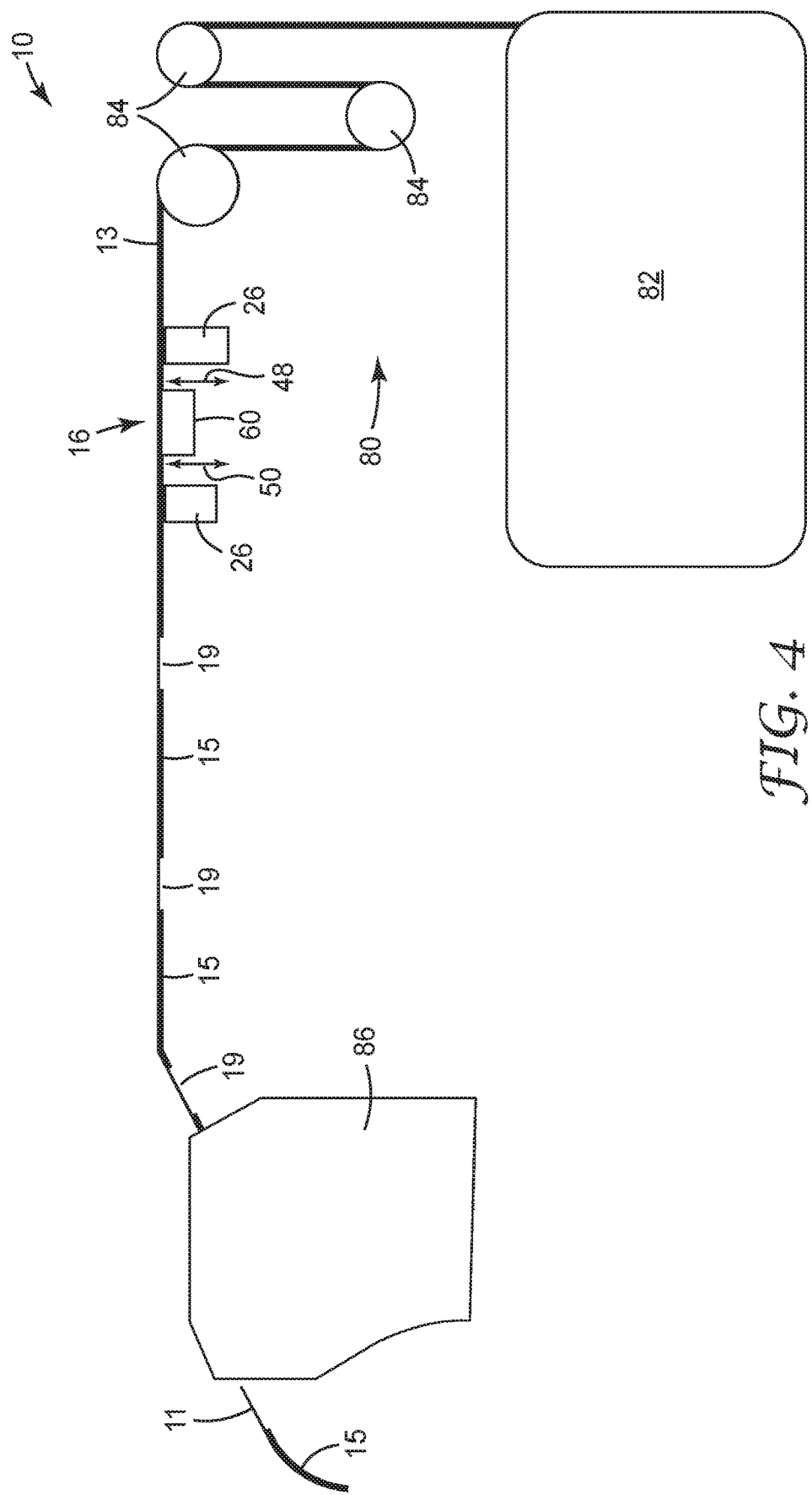
FIG. 4 is a schematic side view of an additional apparatus used in accordance with an additional method embodiment of the present invention.

The method of FIG. 4 is similar to that of FIG. 3 except that the application head 78 is replaced with a fixed length tape dispenser 86 that includes a third cutting blade 22 therein that cuts the exposed liner portion 19 so as to form a corresponding liner tab 11. The dispenser 86 then dispenses individual pieces of the length of tape 15 with its corresponding liner tab 11, which are then manually applied to a desired substrate surface 17.

Figure 5:
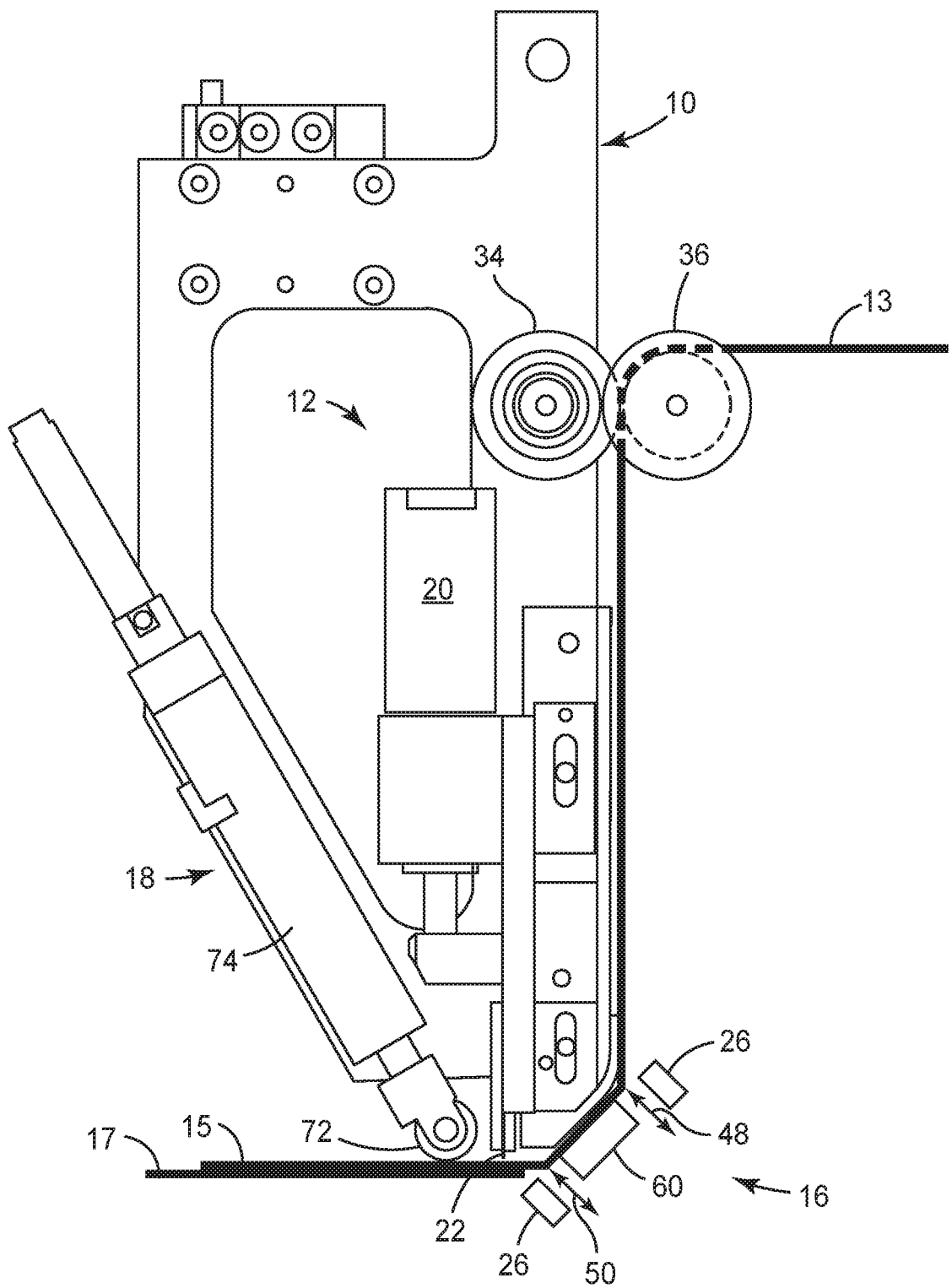
FIG. 5 is a schematic side view of a further apparatus used in accordance with a further method embodiment of the present invention.

The method of FIG. 5 is similar to that of FIG. 2 except that the adhesive tape slug forming and removing assembly 16 is located just before the cutting blade 22 of the third blade actuating mechanism 12 on the tape application head 10. In a variation of this method, the cutting blades 48 and 50 still perform a kiss cut on the tape 13, without cutting through the underlying release liner 19, and the resulting slug is then removed, as previously described. However, instead of using the mechanism 12, the extended liner tab 11 is formed by actuating the first or upstream cutting blade 48 again, but this time to cut through the liner portion 19.

Figure 6:
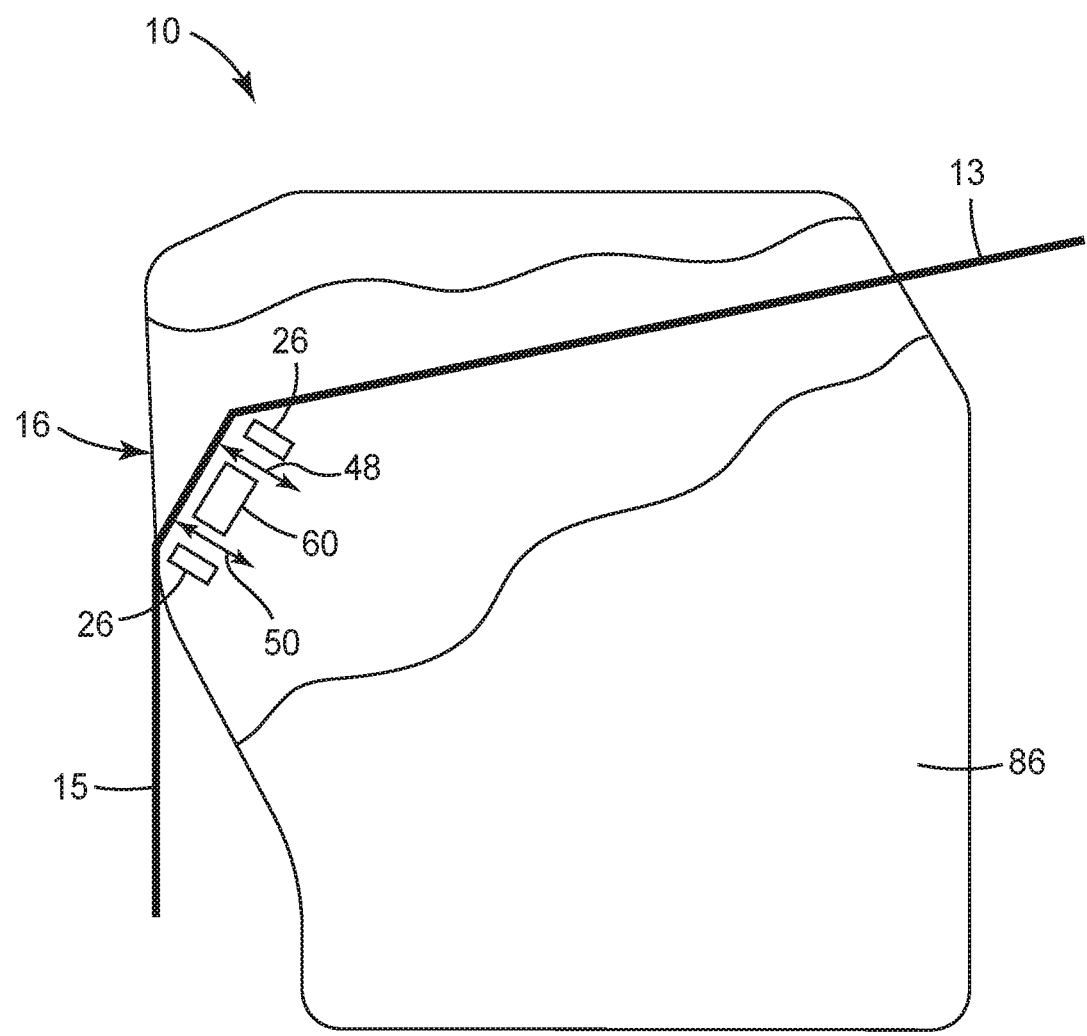
FIG. 6 is a partially broken open schematic side view of a different apparatus used in accordance with a different method embodiment of the present invention.

In the method of FIG. 6, the adhesive tape slug forming and removing assembly 16 is located inside of a fixed length tape dispenser 86, and the apparatus 10 does not include an adhesive tape moving assembly 14 and a tape application assembly 18. In addition, instead of using a third blade actuating mechanism 12, the extended liner tab 11 is formed by actuating the first or upstream cutting blade 48 again, but this time to cut through the liner portion 19.

Figure 7:
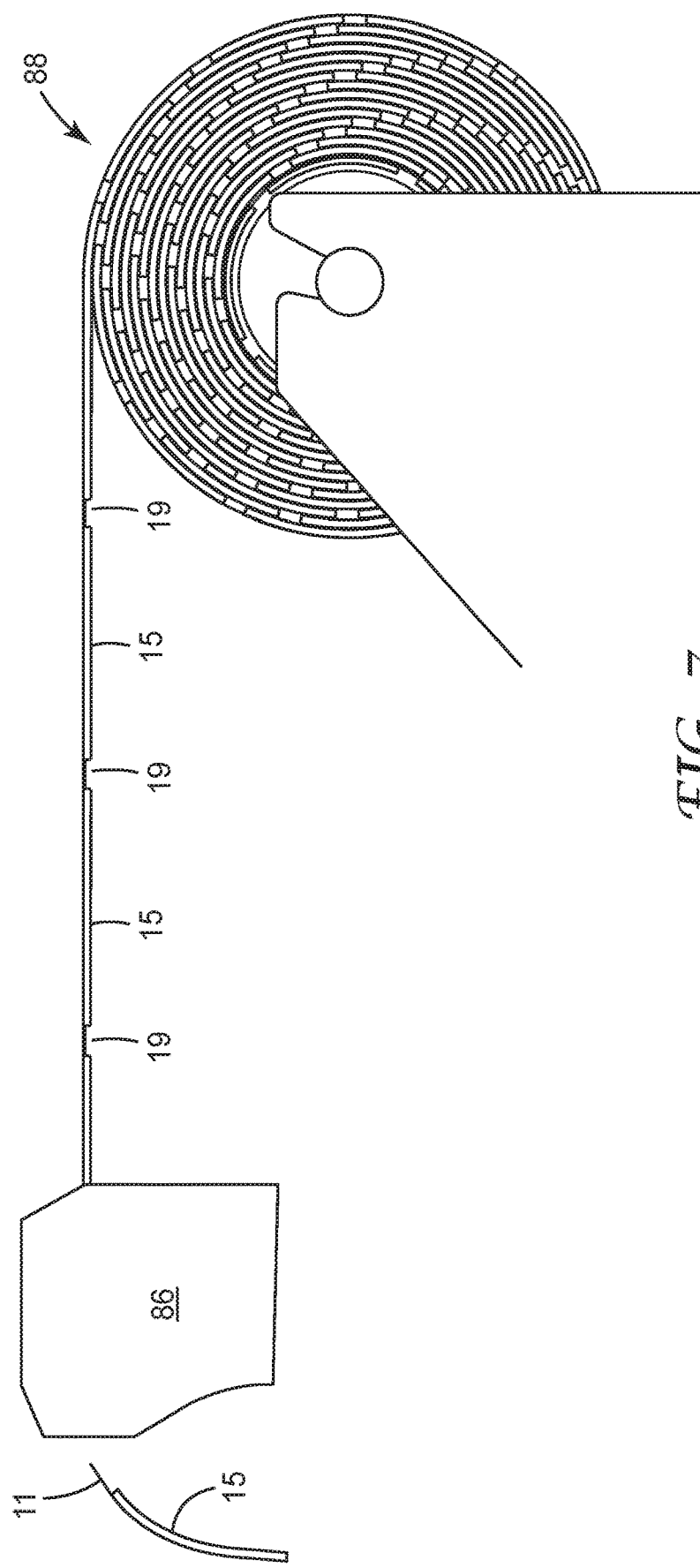
FIG. 7 is a schematic side view of an alternative apparatus used in accordance with an alternative method embodiment of the present invention.

In the method of FIG. 7, a continuous tape of alternating tape lengths 15 and underlying release liner portions 19 are pre-formed and wound into a spool 88. The spool 88 can then be used as a source of tape to be feed, e.g., into a fixed length tape dispenser 86, like that used in the method of FIG. 4, or into an applicator head 78, like that used in the method of FIG. 3.

The following are additional exemplary embodiments in accordance with the principles of the present invention.

Exemplary Embodiments

Method Embodiments of Making Tape with Extended Liner Tab:

1. A method of making at least one or multiple lengths of a release liner-backed double-sided adhesive tape, with each length having an extended liner tab, said method comprising:
  (A) providing a continuous or finite length of release liner-backed double-sided adhesive tape comprising an adhesive tape having at least one or opposite free ends and opposite sides, with each of the opposite sides having a major surface of adhesive, a release liner protecting one major surface of adhesive, and the other major surface of adhesive being exposed;
  (B) forming an adhesive tape slug by isolating (e.g., cutting, detaching, disconnecting, removing, etc.) an adhesive tape slug from the adhesive tape, with the adhesive tape slug having a slug length equal to or greater than the tab length of the extended liner tab to be formed;
  (C) removing the adhesive tape slug so as to expose an underlying length of the release liner and form a remaining length of the adhesive tape, with the underlying length of the release liner having opposite ends (e.g., a leading opposite end and a trailing opposite end); and
  (D) cutting (e.g., with a cutting blade, laser, hot knife, etc.) through the release liner at one of the opposite ends or at some point between the opposite ends of the underlying length of the release liner so as to form the extended liner tab,
  wherein the extended liner tab has a tab length equal to or less than the slug length of the adhesive tape slug.

Step (D) can be performed starting from either side of the release liner.

As used herein, the term "tape" typically refers to a structure that is longer than it is wide (e.g., at least 10 times as long as it is wide) and wider than it is thick (e.g., at least 4 times as wide as it is thick). However, a tape may also refer to a sheet-like structures that are much longer and wider than they are thick (e.g., at least 10 times as long or wide as it is thick) and that have a length and width that are comparable in size (e.g., at least as long as it is wide). Otherwise, the resulting finite length of release liner-backed double-sided adhesive tape with the extended liner tab includes those formed (e.g., die cut) with whatever peripheral shape is desired (e.g., rectangular, curved, oval, circular, ornamental, indicia, symmetrical, asymmetrical, geographical, etc.). The peripheral shape of the adhesive tape can be formed during the forming of the adhesive tape slug, during the cutting through the release liner, in a separate operation or in a combination of such operations.

As used herein, the terms "adhesive tape slug", "tape slug" and "slug" each refer to a portion of the adhesive tape that is removed so as to expose a corresponding portion of the release liner that was underlying the removed piece of the adhesive tape. The adhesive tape slug is typically discarded or repurposed. The adhesive tape slug has a length that is equal to or greater than the tab length of the extended liner tab to be formed, depending on where step (D) is performed.

A double-sided adhesive tape refers to an adhesive tape having at least one or opposite free ends and opposite sides, with each of the opposite sides having a major surface of adhesive. In one embodiment, the adhesive tape comprises a backing (e.g., a layer of foam, a film layer, etc.) having opposite major surfaces, and a layer of adhesive disposed on each of the major surfaces of the backing. In another embodiment, the adhesive tape has a single layer construction (e.g., a layer of an adhesive foam). Typically, the adhesive on both sides of the adhesive tape is a pressure sensitive adhesive. It may be desirable, for only the adhesive protected by the release liner to be a pressure sensitive adhesive, with the adhesive on the other side of the tape being another type of adhesive such as, e.g., a heat activated adhesive, a light (e.g., ultraviolet light, e-beam, or other actinic radiation) activated adhesive, hot melt adhesive, or other non-pressure sensitive adhesive.

2. The method according to embodiment 1, wherein the adhesive tape slug has opposite ends, and said forming comprises isolating only one end of the adhesive tape slug, when the slug length begins or ends at the free end of the adhesive tape, or isolating both ends of the adhesive tape slug, when the slug length does not begin or end at any free end of the adhesive tape (e.g., when the adhesive tape slug is formed somewhere between either end of the adhesive tape). As used herein, a "free end" of, e.g., the adhesive tape refers to the beginning or end of any length of adhesive tape.

3. The method according to embodiment 1 or 2, wherein the extended liner tab is formed by a) performing step (B), then either step (C) then step (D) or step (D) then step (C); b) isolating one end of the adhesive tape slug from the adhesive tape and then performing step (D) or performing step (D) and then isolating one end of the adhesive tape slug from the adhesive tape, followed by isolating the other end of the adhesive tape slug from the adhesive tape and then performing step (C); or c) isolating the other end of the adhesive tape slug from the adhesive tape, where the other end is spaced the slug length of the adhesive tape slug from the free end of the adhesive tape, then performing step (C), followed by either isolating the one end of another adhesive tape slug (e.g., the next adhesive tape slug to be formed) from the adhesive tape then performing step (D) or performing step (D) then isolating the one end of the other adhesive tape slug from the adhesive tape, where the one end of the other adhesive tape slug (e.g., the next adhesive tape slug to be formed) is located a desired finite length upstream from the other end of the one adhesive tape slug (i.e., the downstream opposite end of the underlying length of the release liner corresponding to the next adhesive tape slug to be formed).

4. A method of making at least one or multiple lengths of a release liner-backed double-sided adhesive tape, with each length having an extended liner tab, said method comprising:
- (A) providing a continuous or finite length of release liner-backed double-sided adhesive tape comprising an adhesive tape having at least one or opposite free ends and opposite sides, with each of the opposite sides having a major surface of adhesive, a release liner protecting one major surface of adhesive, and the other major surface of adhesive being exposed;
- (B) forming an adhesive tape slug, said forming comprising (1) cutting (e.g., with a cutting blade, laser, hot knife, etc.) through (i.e., severing) the adhesive tape at a first location, without cutting through (i.e., severing) the release liner, and (2) cutting (e.g., with a cutting blade, laser, hot knife, etc.) through (i.e., severing) the adhesive tape at a second location spaced along the adhesive tape from the first location, with the adhesive tape slug having a slug length equal to or greater than the tab length of the extended liner tab to be formed;
- (C) removing the adhesive tape slug so as to expose an underlying length of the release liner and form a remaining length of the adhesive tape, with the underlying length of the release liner having opposite ends (e.g., a leading opposite end and a trailing opposite end); and
- (D) cutting (e.g., with a cutting blade, laser, hot knife, etc.) through the release liner at one of the opposite ends or at some point between the opposite ends of the underlying length of the release liner,
- wherein the extended liner tab has a tab length equal to or less than the slug length of the adhesive tape slug, and the extended liner tab is formed by a) performing step (B)(1) contemporaneously with, in sequence (i.e., first one then the other or first the other and then the one) with, or at the same time as step (B)(2), then either step (C) then step (D) or step (D) then step (C); b) performing step (B)(2) then step (D) or step (D) then step (B)(2), followed by step (B)(1) then step (C); or c) performing step (B)(1) where the first location is spaced the slug length of the adhesive tape slug from the free end of the adhesive tape, then step (C), followed by step (B)(2) then step (D) or step (D) then step (B)(2) where the second location is a desired finite length upstream from the first location (i.e., the second location is the downstream opposite end of the underlying length of the release liner corresponding to the next adhesive tape slug to be formed).

Step (D) can be performed starting from either side of the release liner. The terms upstream and downstream are relative to the movement of the adhesive tape. For example, as the adhesive tape is moved forward, its free end at the beginning of the tape would be its upstream end.

5. The method according to any one of embodiments 1 to 4, wherein step (D) forms a free end (i.e., an end that was severed before or after the adhesive tape slug is formed) of the extended liner tab that extends beyond the remaining length of the adhesive tape. When the release liner is cut through at one of the opposite ends of the underlying length of the release liner (e.g., the leading opposite end), the tab length of the extended liner tab can be equal to the exposed underlying length of the release liner.

6. The method according to embodiment 4 or 5, wherein the extended liner tab is formed by performing step (B)(1) contemporaneously with, in sequence (i.e., first one then the other or first the other and then the one) with, or at the same time as step (B)(2), then either step (C) then step (D) or step (D) then step (C).

7. The method according to any one of embodiments 1 to 6, wherein step (B) is performed, then step (C) is performed, and then the release liner-backed double-sided adhesive tape is moved so as to feed a finite length of the release liner-backed double-sided adhesive tape out of a tape dispenser, and then step (D) is performed so as to form an extended liner tab on the finite length of release liner-backed double-sided adhesive tape.

8. The method according to any one of embodiments 1 to 6, wherein step (B) is performed and then step (C) is performed, multiple times at spaced apart locations along the continuous or finite length of release liner-backed double-sided adhesive tape so as to form multiple finite lengths of adhesive tape spaced apart on the release liner, and then the release liner-backed double-sided adhesive tape is moved so as to feed the multiple finite lengths of adhesive tape out of a tape dispenser, and then step (D) is performed multiple times so as to form multiple finite lengths of release liner-backed double-sided adhesive tape, with each finite length of release liner-backed double-sided adhesive tape having an extended liner tab on one or both ends thereof.

9. The method according to embodiment 8, wherein each finite length of adhesive tape is spaced apart by an underlying length of the release liner (i.e., the length of a corresponding adhesive tape slug).

10. The method according to any one of embodiments 1 to 9, wherein each finite length of adhesive tape has opposite ends, and said method further comprises:
(E) cutting (e.g., with a cutting blade, laser, hot knife, etc.) through the release liner and the adhesive tape, of the release liner-backed double-sided adhesive tape, at some point (e.g., half way) between the opposite ends of at least one, multiple or each finite length of adhesive tape,
- wherein each extended liner tab has a tab length less than the slug length of the adhesive tape slug, and each extended liner tab is formed by performing step (D) at some point between the opposite ends of at least one, multiple or each underlying length of the release liner.

11. The method according to any one of embodiments 1 to 10, wherein the adhesive tape comprises a free end, and said method further comprises:
- applying the free end of the adhesive tape to the substrate;
- at a finite length from the free end of the adhesive tape, performing step (B), then either step (D) then step (C) or step (C) then step (D); and
- applying a remainder of the finite length of the adhesive tape to the substrate.

12. The method according to any one of embodiments 1 to 11, wherein the extended liner tab is formed by cutting through (i.e., severing) the adhesive tape, without cutting through (i.e., severing) the release liner, at points along the adhesive tape corresponding to each of the opposite ends (e.g., the leading opposite end and the trailing opposite end) of the underlying length of the release liner, and then cutting through (i.e., severing) the release liner either at one of the opposite ends (e.g., the leading opposite end) or at some point between the opposite ends of the underlying length of the release liner, with the adhesive tape slug being removed either before or after said cutting through (i.e., severing) the release liner.

13. The method according to embodiment 4 or 5, wherein the extended liner tab is formed by performing step (B)(2) then step (D) or step (D) then step (B)(2), followed by step (B)(1) then step (C).

14. The method according to any one of embodiments 1 to 5 and 13, wherein the extended liner tab is formed by cutting through (i.e., severing) the adhesive tape and the release liner at a point along the release liner-backed double-sided adhesive tape corresponding to one opposite end (e.g., the leading opposite end or trailing opposite end) of the underlying length of the release liner, and cutting through (i.e., severing) the adhesive tape, without cutting through (i.e., severing) the release liner, at a point along the adhesive tape corresponding to the other opposite end (e.g., the trailing opposite end or leading opposite end) of the underlying length of the release liner, followed by removing the adhesive tape slug.

15. The method according to embodiment 14, wherein the one opposite end is a leading or upstream opposite end, and the other opposite end is a trailing or downstream opposite end. The terms leading or upstream and trailing or downstream are relative to the movement of the adhesive tape. For example, as the adhesive tape is moved forward, its free end at the beginning of the tape would be its leading or upstream end.

16. The method according to embodiment 14, wherein the one opposite end is a trailing opposite end, and the other opposite end is a leading opposite end.

17. The method according to any one of embodiments 14 to 16, wherein the adhesive tape and the release liner, at a point along the release liner-backed double-sided adhesive tape corresponding to one opposite end (e.g., the leading opposite end or trailing opposite end) of the underlying length of the release liner, are cut through (i.e., severing) at the same time.

18. The method according to any one of embodiments 1 to 5 and 13, wherein the extended liner tab is formed by cutting (e.g., with a cutting blade, laser, hot knife, etc.) through (i.e., severing) the adhesive tape and the release liner at one of the opposite ends (e.g., a leading opposite end) of the underlying length of the release liner; then cutting (e.g., with a cutting blade, laser, hot knife, etc.) through (i.e., severing) the adhesive tape at the other opposite end (e.g., a trailing opposite end) of the underlying length of the release liner, without cutting through (i.e., severing) the release liner; and then removing the adhesive tape slug so as to expose the underlying length of the release liner.

19. The method according to embodiment 18, wherein the adhesive tape and the release liner, at the one opposite end (e.g., a leading opposite end) of the underlying length of the release liner, are cut through (i.e., severing) at the same time.

20. The method according to embodiment 4 or 5, wherein the extended liner tab is formed by performing step (B)(1), where the first location is spaced the slug length of the adhesive tape slug from the free end of the adhesive tape, then step (C), followed by step (B)(2) then step (D) or step (D) then step (B)(2) where the second location is a desired finite length upstream from the first location (i.e., the second location is the downstream opposite end of the underlying length of the release liner corresponding to the next adhesive tape slug to be formed).

21. The method according to embodiment 20, wherein the second location is the downstream opposite end of the underlying length of the release liner corresponding to a next adhesive tape slug to be formed, and said method further comprises performing step (B)(1) so as to form the next adhesive tape slug, and then step (C) so as to remove the next adhesive tape slug.

22. The method according to any one of embodiments 1 to 21, wherein the adhesive tape slug is removed immediately after the adhesive tape slug is formed.

23. The method according to any one of embodiments 1 to 22, wherein said removing the adhesive tape slug comprises securing the adhesive tape slug to a leading or other portion of a slug removal actuator, and after the adhesive tape slug is secured, actuating the slug removal actuator to move the portion of the slug removal actuator and the secured adhesive tape slug away from the underlying length of the release liner.

24. The method according to any one of embodiments 1 to 19, 22 and 23, wherein the extended liner tab is formed by cutting through (i.e., severing) the adhesive tape, without cutting through (i.e., severing) the release liner, at points along the adhesive tape corresponding to each of the opposite ends (e.g., the leading opposite end and the trailing opposite end) of the underlying length of the release liner, and cutting through (i.e., severing) the release liner either at one of the opposite ends (e.g., the leading opposite end) or at some point between the opposite ends of the underlying length of the release liner, with the adhesive tape slug being removed either before or after said cutting through (i.e., severing) the release liner.

25. The method according to any one of embodiments 1 to 24, wherein said forming the adhesive tape slug comprises moving spaced apart cutting blades toward the adhesive tape so as to cut through (i.e., sever) the adhesive tape, without one of the cutting blades cutting through (i.e., severing) the release liner, and with the other of the cutting blades cutting through (i.e., severing) the release liner.

26. The method according to any one of embodiments 1 to 24, wherein said forming the adhesive tape slug comprises moving spaced apart cutting blades toward the adhesive tape so as to cut through (i.e., sever) the adhesive tape, without either of the cutting blades cutting through (i.e., severing) the release liner.

27. The method according to embodiment 25 or 26, wherein said removing the adhesive tape slug comprises moving one of the cutting blades towards the other cutting blade or moving both of the cutting blades towards each other, while the adhesive tape slug is positioned between the cutting blades, and said moving the cutting blades towards each other causes the adhesive tape slug to separate from the underlying length of the release liner.

28. The method according to any one of embodiments 25 to 27, wherein said removing the adhesive tape slug comprises securing the adhesive tape slug between the cutting blades, and moving the cutting blades away from the underlying length of the release liner so as to separate (e.g., pull off) the adhesive tape slug from the liner-backed double-sided adhesive tape.

29. The method according to any one of embodiments 1 to 22 and 24 to 28, wherein said removing the adhesive tape slug comprises securing the adhesive tape slug to a leading or other portion of a slug removal actuator, and actuating the slug removal actuator to move the portion of the slug removal actuator away from the underlying length of the release liner so as to separate (e.g., pull off) the adhesive tape slug from the liner-backed double-sided adhesive tape.

30. The method according to any one of embodiments 25 to 28, wherein said removing the adhesive tape slug comprises securing the adhesive tape slug to a leading or other portion of a slug removal actuator, the portion of the slug removal actuator comprises the cutting blades, said securing the adhesive tape slug comprises moving one of the cutting blades towards the other cutting blade or moving both of the cutting blades towards each other so as to secure the adhesive tape slug between the cutting blades, and after the adhesive tape slug is secured, said actuating the slug removal actuator comprises moving the cutting blades away from the underlying length of the release liner so as to separate (e.g., pull off) the adhesive tape slug from the release liner-backed double-sided adhesive tape.

31. The method according to any one of embodiments 1 to 26, wherein said removing the adhesive tape slug comprises securing the adhesive tape slug to a leading or other portion of a slug removal actuator and moving the leading or other portion away from the underlying length of the release liner so as to separate (e.g., pull off) the adhesive tape slug from the release liner-backed double-sided adhesive tape, with the adhesive tape slug being secured to the leading or other portion by (a) applying a suction (e.g., from a vacuum producing or other suction forming device) to an exposed major or other surface of the slug, (b) grabbing or embedding into the slug (e.g., by a pair or more of opposing grabbing implements or jaws, or by an embedding tool), (c) temporarily or removably adhering the portion of the slug removal actuator to an exposed adhesive major surface of the adhesive tape slug (e.g., by providing a release material surface on the portion of the slug removal actuator that can bond to, but subsequently release from, the exposed adhesive major surface of the adhesive tape slug), or (d) any combination of securing operations (a) to (c).

32. The method according to any one of embodiments 25 to 28 and 30, wherein said method further comprises removing the adhesive tape slug from between the cutting blades.

33. The method according to any one of embodiments 23 and 29 to 31, wherein said method further comprises removing the adhesive tape slug from the leading or other portion of the slug removal actuator.

34. The method according to any one of embodiments 1 to 33, wherein said forming the adhesive tape slug and said removing the adhesive tape slug are performed multiple times at different spaced apart locations along the release liner-backed double-sided adhesive tape.

35. The method according to any one of embodiments 1 to 33, wherein said forming the adhesive tape slug and said removing the adhesive tape slug are performed multiple times at different spaced apart locations along the release liner-backed double-sided adhesive tape, so as to form a stack of adhesive tape slugs. As used herein, a "stack" of adhesive tape slugs comprises at least 2, 3, 4, 5 or more adhesive tape slugs that are adhered together, one on top of the other.

36. The method according to any one of embodiments 23, 29 to 31 and 33, wherein said forming the adhesive tape slug and said removing the adhesive tape slug are performed multiple times at different spaced apart locations along the release liner-backed double-sided adhesive tape, so as to form a stack of adhesive tape slugs at the leading or other portion of the slug removal actuator.

37. The method according to any one of embodiments 25 to 28, 30 and 32, wherein said forming the adhesive tape slug and said removing the adhesive tape slug are performed multiple times at different spaced apart locations along the release liner-backed double-sided adhesive tape, so as to form a stack of adhesive tape slugs between the cutting blades.

38. The method according to embodiment 36 or 37, wherein said method further comprises removing the stack of adhesive tape slugs (e.g., from between the cutting blades or from the leading or other portion of a slug removal actuator).

39. The method according to any one of embodiments 1 to 38, wherein the adhesive of the major surface protected by the release liner is a pressure sensitive adhesive or at least exhibits pressure sensitive adhesive characteristics at the tape application temperature (e.g., room temperature).

40. The method according to any one of embodiments 1 to 39, wherein the adhesive tape has a width and a thickness, and said forming the adhesive tape slug comprises cutting through the thickness and across the width of the adhesive tape.

41. The method according to any one of embodiments 1 to 40, wherein the exposed underlying length of the release liner is equal in length to that of the adhesive tape slug and is longer than or equal in length to the extended liner tab.

42. The method according to any one of embodiments 1 to 41, further comprising:
    engaging and moving or at least moving a continuous or finite length of the release liner-backed double-sided adhesive tape along a path and periodically stopping such movement to permit the formation of at least one adhesive tape slug at a location, and thereby form multiple adhesive tape slugs at spaced apart desired locations along the adhesive tape.

43. The method according to any one of embodiments 1 to 42, further comprising:
    engaging and moving or at least moving a continuous or finite length of the release liner-backed double-sided adhesive tape to an adhesive tape slug forming station or other location to permit the formation of an adhesive tape slug at a desired location along the continuous or finite length of release liner-backed double-sided adhesive tape.

44. The method according to embodiment 43, further comprising:
    engaging and moving or at least moving a continuous or finite length of the release liner-backed double-sided adhesive tape to an adhesive tape slug removing station or other location to permit the removal of each adhesive tape slug formed.

45. The method according to embodiment 44, further comprising:
    engaging and moving or at least moving a continuous or finite length of the release liner-backed double-sided adhesive tape to an extended liner tab forming station or other location to permit the forming of an extended liner tab, after each adhesive tape slug is removed, by cutting of the release liner at one of the opposite ends or at some point between the opposite ends of each underlying length of the release liner.

46. The method according to embodiment 45, wherein each of the adhesive tape slug forming station or other location, adhesive tape slug removing station or other location and extended liner tab forming station or other location are the same station or other location or different stations or other locations.

47. The method according to embodiment 46, wherein the adhesive tape slug forming station or other location, adhesive tape slug removing station or other location and extended liner tab forming station or other location are all mounted, e.g., directly or indirectly to a fixed structure (e.g., on a frame structure) at a fixed location (e.g., on a facility floor) or to a movable structure (e.g., on a tool assembly or end effector) on a movable location (e.g., on the end of a robotic arm).

48. The method according to any one of embodiments 1 to 47, wherein each adhesive tape slug is removed after being formed.

49. The method according to any one of embodiments 1 to 48, wherein the adhesive tape slug has a peripheral edge that defines a non-rectangular or a rectangular periphery.

50. The method according to any one of embodiments 1 to 49, wherein the adhesive tape slug has opposite end edges and opposite side edges, and the adhesive tape slug is formed with at least one or each end edge that forms an obtuse or acute angle with at least one or each side edge. The adhesive tape slug may also have at least one or each end edge that forms a curved (e.g., convex and/or concave) end edge, at least one or each side edge that forms a curved (e.g., convex and/or concave) side edge, or any combination thereof.

Method Embodiments of Dispensing Tape with an Extended Liner Tab:

51. A method of dispensing a continuous or finite length of release liner-backed double-sided adhesive tape, said method of dispensing comprising:
    before being dispensed, forming an extended liner tab on a length of release liner-backed double-sided adhesive tape by the method according to any one of embodiments 1 to 50; and
    dispensing the length of release liner-backed double-sided adhesive tape, e.g., from a tape dispenser.

52. The method according to embodiment 51, wherein the length of release liner-backed double-sided adhesive tape is finite and has a trailing end, and the extended liner tab is formed at the trailing end by performing either a) step (B), then step (C) and then step (D), or b) step (B), then step (D) and then step (C).

53. The method according to embodiment 52, wherein the extended liner tab is formed at the trailing end by performing step (B), then step (D) and then step (C), and an operator or a robot controlled end effector or other tool assists in separating the adhesive tape slug from the corresponding extended liner tab by pulling the finite length of release liner-backed double-sided adhesive tape out of the dispenser.

54. The method according to embodiment 51, wherein each extended liner tab is formed by performing step (B), then step (D), and after said dispensing, e.g., from a tape dispenser, then step (C).

Method Embodiments of Applying Tape with Extended Liner Tab:

55. A method of applying multiple finite lengths of release liner-backed double-sided adhesive tape, said method comprising:
    dispensing or feeding each length of release liner-backed double-sided adhesive tape by the method according to embodiment 51; and
    applying each dispensed length of release liner-backed double-sided adhesive tape to a substrate surface either a) by hand, b) by automatically move each length of release liner-backed double-sided adhesive tape to a surface of a substrate or c) by automatically moving a substrate surface to each length of release liner-backed double-sided adhesive tape.

56. The method according to embodiment 55, wherein each dispensed length of release liner-backed double-sided adhesive tape is applied to a substrate surface either a) by an application tool or head (e.g. an end effector) mounted on the end of a computer controlled robotic mechanism (e.g., an arm) operatively adapted to automatically move each length of release liner-backed double-sided adhesive tape so as to contact and bond to the substrate surface or b) by a stationary application tool or head operatively adapted to maintain each length of release liner-backed double-sided adhesive tape in position (e.g., with the exposed major surface of adhesive facing upwards) for being contacted by and bonded to the surface of a substrate mounted on a computer controlled robotic mechanism (e.g., an arm) operatively adapted to for automatically moving one substrate surface to each positioned length of release liner-backed double-sided adhesive tape.

57. A method of automatically adhering or adhesively bonding a length of release liner-backed double-sided adhesive tape to a substrate, said method comprising:
    making at least one or multiple finite lengths of a release liner-backed double-sided adhesive tape, with its release liner having an extended liner tab made by the method according to any one of embodiments 1 to 50;
    dispensing each length of release liner-backed double-sided adhesive tape; and
    applying the exposed major surface of adhesive of each dispensed length of release liner-backed double-sided adhesive tape so as to adhere to a surface of a substrate, with its release liner and extended liner tab being exposed.

58. A method of adhering a first substrate to a second substrate, said method comprising:
    adhesively bonding a length of release liner-backed double-sided adhesive tape to a first substrate according to the method of any one of embodiments 55 to 57;
    pulling the extended liner tab so as to remove the release liner and expose the underlying major surface of adhesive; and
    applying the underlying major surface of adhesive on the first substrate so as to adhere to a surface of a second substrate.

Such substrates can include, for example, any combination of an exterior or interior surface of a vehicle (e.g., an automobile, watercraft, or aircraft), appliance, decorative structure (e.g., an interior or exterior molding, emblem or trim, etc.), or structural structure (e.g., weatherstrip, etc.) to be bonded to another exterior or interior surface of a vehicle, appliance, decorative structure, or structural structure (e.g., a window frame, door frame, etc.). The first substrate could also be a release liner, with multiple individual lengths of liner-backed and tabbed adhesive tape releasably bonded to and held together along the release liner for subsequent use.

Apparatus Embodiments for Making Tape with Extended Liner Tab:

59. An apparatus for automatically forming an extended liner tab at a desired location (e.g., a leading end, a trailing end or any desired location therebetween) on, or at multiple spaced apart desired locations along, a continuous or finite length of release liner-backed double-sided adhesive tape, with the release liner-backed double-sided adhesive tape comprising an adhesive tape having opposite sides, with each side having a major surface of adhesive, a release liner protecting one major surface of adhesive, and the other major surface of adhesive being exposed, said apparatus comprises:

an adhesive tape moving assembly operatively adapted (i.e., dimensioned, designed and/or configured) for a) engaging and moving or at least moving (e.g., by passing the release liner-backed double-sided adhesive tape between at least one drivable roller or belt and an opposing surface, roller or belt, which may also be drivable) a continuous or finite length of the release liner-backed double-sided adhesive tape along a path and periodically stopping such movement to permit the formation of an adhesive tape slug at desired spaced apart locations along the adhesive tape, or b) engaging and moving or at least moving (e.g., via an end effector or tool on a robotic arm or other mechanism) a finite length of the release liner-backed double-sided adhesive tape to an adhesive tape slug forming station or other location to permit the formation of an adhesive tape slug at a desired location along the adhesive tape;

an adhesive tape slug forming assembly operatively adapted for cutting (e.g., with a cutting blade, laser, hot knife, etc.) through (i.e., severing) the adhesive tape at a location, without cutting through (i.e., severing) the release liner and for cutting (e.g., with a cutting blade, laser, hot knife, etc.) through (i.e., severing) the adhesive tape at another location spaced along the adhesive tape from the one location so as to form the adhesive tape slug, with the adhesive tape slug having a slug length equal to or greater than the tab length of the extended liner tab to be formed; and an adhesive tape slug removal assembly operatively adapted for removing the adhesive tape slug from a remaining length of the adhesive tape so as to expose an underlying length of the release liner, with the underlying length of the release liner having opposite ends (e.g., a leading opposite end and a trailing opposite end).

60. The apparatus according to embodiment 59, wherein said apparatus comprises the path, said adhesive tape moving assembly engages and moves or at least moves a continuous or finite length of the release liner-backed double-sided adhesive tape along the path and periodically stops such movement to permit the formation of an adhesive tape slug at desired spaced apart locations along the adhesive tape, and said adhesive tape moving assembly comprises at least one drivable assembly (e.g., a drivable roller or belt assembly) operatively adapted for engaging and moving or at least moving (e.g., by passing the release liner-backed double-sided adhesive tape between at least one drivable roller or belt and an opposing surface, roller or belt, which may also be drivable) a continuous or finite length of the release liner-backed double-sided adhesive tape along the path and periodically stopping such movement to permit the formation of an adhesive tape slug at desired spaced apart locations along the adhesive tape.

61. The apparatus according to embodiment 59, wherein said apparatus comprises the adhesive tape slug forming station or other location, said adhesive tape moving assembly engages and moves or at least moves a finite length of the release liner-backed double-sided adhesive tape to the tape slug forming station or other location to permit the formation of an adhesive tape slug at a desired location along the adhesive tape, and said adhesive tape moving assembly comprises an end effector or tool permanently or removably mounted on a robotic arm or other robotic device operatively adapted (i.e., dimensioned, designed and/or configured) for engaging and moving or at least moving (e.g., by passing the release liner-backed double-sided adhesive tape between at least one drivable roller or belt and an opposing surface, roller or belt, which may also be drivable) a finite length of the release liner-backed double-sided adhesive tape to an adhesive tape slug forming station or other location to permit the formation of an adhesive tape slug at a desired location along the adhesive tape.

62. The apparatus according to embodiment 60, wherein said adhesive tape slug forming assembly comprises spaced apart cutting blades disposed adjacent to an adhesive tape slug forming location on the path and a first blade actuating mechanism operatively adapted (i.e., dimensioned, designed and/or configured) for moving the cutting blades toward the adhesive tape slug forming location so as to cut through (i.e., sever) adhesive tape on the path, without at least one of the cutting blades cutting through (i.e., severing) the release liner.

63. The apparatus according to embodiment 61, wherein said adhesive tape slug forming assembly comprises spaced apart cutting blades disposed adjacent to an adhesive tape slug forming location on the adhesive tape slug forming station or other location, and a first blade actuating mechanism operatively adapted for moving the cutting blades toward the adhesive tape slug forming location so as to cut through (i.e., sever) adhesive tape at the adhesive tape slug forming station or other location, without at least one of the cutting blades cutting through (i.e., severing) the release liner.

64. The apparatus according to embodiment 62 or 63, wherein said first blade actuating mechanism is operatively adapted for either a) moving both cutting blades so as to cut through the adhesive tape without cutting through the release liner or (b) moving one cutting blade so as to cut through the adhesive tape and the release liner and moving the other cutting blade so as to only cut through the adhesive tape.

65. The apparatus according to any one of embodiments 59 to 64, wherein said tape slug forming assembly is operatively adapted for cutting through (i.e., severing) the release liner at the other location, at the same time as cutting through (i.e., severing) the adhesive tape at the other location.

66. The apparatus according to any one of embodiments 59 to 65, wherein said tape slug forming assembly is operatively adapted for cutting through (i.e., severing) the release liner at the other location, after cutting through (i.e., severing) the adhesive tape at the other location.

67. The apparatus according to any one of embodiments 59 to 66, wherein said adhesive tape slug removal assembly comprises a slug removal actuator having a leading or other portion operatively adapted (i.e., dimensioned, designed and/or configured) for being secured to or otherwise securing the adhesive tape slug thereto, and after the adhesive tape slug is secured, said slug removal actuator is operatively adapted (i.e., dimensioned, designed and/or configured) for moving the portion of the slug removal actuator and the secured adhesive tape slug away from the underlying length of the release liner.

68. The apparatus according to embodiment 67, wherein said adhesive tape slug forming assembly comprises spaced apart cutting blades and a first blade actuating mechanism operatively adapted (i.e., dimensioned, designed and/or configured) for moving the cutting blades so as to cut through (i.e., sever) adhesive tape on the path, without at least one of the cutting blades cutting through (i.e., severing) the release liner, the portion of the adhesive tape slug removal actuator comprises said cutting blades, and said adhesive tape slug removal actuator is operatively adapted for moving one of the cutting blades towards the other cutting blade, or moving both of the cutting blades towards each other, so as to secure the adhesive tape slug between the cutting blades.

69. The apparatus according to embodiment 68, wherein said adhesive tape slug removal actuator is operatively adapted for moving the cutting blades away from the underlying length of the release liner so as to separate (e.g., pull off) the adhesive tape slug from the release liner-backed double-sided adhesive tape.

70. The apparatus according to embodiment 68 or 69, wherein said adhesive tape slug removal actuator comprises a second blade actuating mechanism operatively adapted for moving the cutting blades toward each other, after both cutting blades have at least cut through the adhesive tape and formed the adhesive tape slug.

71. The apparatus according to embodiment 70, wherein said second blade actuating mechanism is operatively adapted for moving the cutting blades away from the underlying length of the release liner, after the cutting blades are moved together.

72. The apparatus according to embodiment 70 or 71, wherein said second blade actuating mechanism is operatively adapted for moving the cutting blades away from the tape slug forming location, after the cutting blades are moved together.

73. The apparatus according to any one of embodiments 68 to 72, wherein said adhesive tape slug removal actuator is operatively adapted to cause the adhesive tape slug to separate (e.g., pull off) from the underlying length of the release liner, when moving one of the cutting blades towards the other cutting blade or moving both of the cutting blades towards each other.

74. The apparatus according to embodiment 67, wherein the portion of said slug removal actuator comprises securing structure for temporarily securing the portion of said slug removal actuator to the adhesive tape slug, said securing structure comprising (a) a vacuum producing or other suction forming device operatively adapted for applying a suction to an exposed major or other surface of the adhesive tape slug, (b) a grabbing or embedding device operatively adapted for grabbing or embedding into the adhesive tape slug (e.g., a pair or more of opposing grabbing implements or jaws, or an embedding tool), (c) a release material surface on the portion of the slug removal actuator that can bond to, but subsequently release from, an exposed adhesive major surface of the adhesive tape slug, or (d) any combination of (a) to (c).

75. The apparatus according to any one of embodiments 59 to 74, further comprising:
    a source of the continuous or finite length of release liner-backed double-sided adhesive tape.

76. The apparatus according to embodiment 75, wherein said source comprises a roll of the continuous or finite length of release liner-backed double-sided adhesive tape wound (e.g., level wound) around a spool.

77. The apparatus according to any one of embodiments 62, 63 and 68-73, wherein the spaced apart cutting blades of said adhesive tape slug forming assembly are first and second cutting blades, and said apparatus further comprises an extended liner tab forming assembly comprising a third cutting blade and a third blade actuating mechanism operatively adapted (i.e., dimensioned, designed and/or configured) for moving the third cutting blade so as to cut through (i.e., sever) the release liner either at one of the opposite ends (e.g., the leading opposite end) or at some point between the opposite ends of the underlying length of the release liner, after the adhesive tape slug is removed.

Apparatus Embodiments for Bonding Tape to a Substrate:

78. An apparatus for automatically adhesively bonding a length of release liner-backed double-sided adhesive tape to a substrate, with the release liner-backed double-sided adhesive tape comprising an adhesive tape having opposite sides, with each side having a major surface of adhesive, a release liner protecting one major surface of adhesive, and the other major surface of adhesive being exposed, said apparatus comprising:
    a forming apparatus for automatically forming an extended liner tab at a desired location (e.g., a leading end, a trailing end or any desired location therebetween) on, or at multiple desired spaced apart locations along, the continuous or finite length of release liner-backed double-sided adhesive tape, said forming apparatus comprising the apparatus according to any one of embodiments 59 to 77;
    a dispensing assembly for dispensing each length of release liner-backed double-sided adhesive tape formed by said forming apparatus; and
    an applying assembly for applying the exposed major surface of adhesive of each dispensed length of release liner-backed double-sided adhesive tape so as to adhere to a surface of a substrate, with its release liner and extended liner tab being exposed.

79. An apparatus for adhering a first substrate to second substrate, said apparatus comprising:
    an apparatus for automatically adhesively bonding a length of release liner-backed double-sided adhesive tape to a first substrate according to embodiment 78, with the release liner-backed double-sided adhesive tape comprising an adhesive tape having opposite sides, with each side having a major surface of adhesive, a release liner protecting one major surface of adhesive, and the other major surface of adhesive being exposed;
    a pulling assembly for pulling the extended liner tab so as to remove the release liner and expose the underlying major surface of adhesive; and
    an applying assembly for applying the underlying major surface of adhesive on the first substrate so as to adhere to a surface of a second substrate.

Adhesive Tape Embodiments:

80. A length of release liner-backed double-sided adhesive tape comprising a plurality of spaced apart finite lengths of an adhesive tape and a release liner, with each length of adhesive tape having opposite sides, each side having a major surface of adhesive, and one major surface of adhesive on one side of each finite length of adhesive tape being protected by said release liner, wherein an exposed length of said release liner (i.e., a length of release liner that is not adhered or otherwise bonded to adhesive tape) is disposed between adjacent lengths of said adhesive tape. Each exposed length of release liner can be an underlying length of the release liner that is exposed when its corresponding adhesive tape slug is removed. At least one or two extended liner tabs can be formed from at least part of each exposed length of release liner.

81. The tape according to embodiment 80, wherein said plurality of spaced apart finite lengths of an adhesive tape comprise the same length adhesive tape.

82. The tape according to embodiment 80 or 81, wherein said plurality of spaced apart finite lengths of an adhesive tape comprise different lengths of said adhesive tape.

83. The tape according to any one of embodiments 80 to 82, further comprising another release liner disposed so as to protect the major surface of adhesive on the other side of each finite length of adhesive tape.

84. The tape according to any one of embodiments 80 to 82, wherein the major surface of adhesive on the other side of each finite length of adhesive tape is exposed.

85. The tape according to any one of embodiments 80 to 84, wherein each exposed length of said release liner has a length that can be gripped by human fingers or robotic pincers.

86. The tape according to any one of embodiments 80 to 85, wherein said length of release liner-backed double-sided adhesive tape is wound into a roll.

87. The tape according to embodiment 86, wherein said length of release liner-backed double-sided adhesive tape is wound (e.g., level wound) around a spool.

As used herein, an assembly, device, tool, mechanism, actuator, or a portion thereof is considered operatively adapted for accomplishing an operation or function, when it is dimensioned, designed and/or configured so as to perform that operation or function.

This invention may take on various modifications and alterations without departing from its spirit and scope. Accordingly, this invention is not limited to the above-described but is to be controlled by the limitations set forth in the following claims and any equivalents thereof.

This invention may be suitably practiced in the absence of any element not specifically disclosed herein.

Any and all patents and patent applications cited above, including those in the Background section, are incorporated by reference into this document in total.

What is claimed is:

1. An apparatus for automatically forming an extended liner tab at a location on, or at multiple spaced apart locations along, a liner-backed double-sided adhesive tape, with the liner-backed double-sided adhesive tape comprising an adhesive tape having opposite sides, with each side having a major surface of adhesive, a release liner protecting one major surface of adhesive, and the other major surface of adhesive being exposed, said apparatus comprises:
   a tape moving assembly operatively adapted for a) moving a length of the liner-backed double-sided adhesive tape along a path and periodically stopping such movement to permit the formation of a tape slug, or b) moving a length of the liner-backed double-sided adhesive tape to a tape slug forming location to permit the formation of a tape slug;
   a tape slug forming assembly operatively adapted for cutting through the adhesive tape at a location, without cutting through the release liner and for cutting through the adhesive tape at another location spaced along the adhesive tape from the one location so as to form the tape slug, with the tape slug having a slug length equal to or greater than the tab length of the extended liner tab to be formed; and
   a tape slug removal assembly operatively adapted for removing the tape slug from a remaining length of the adhesive tape so as to expose an underlying length of the release liner, with the underlying length of the release liner having opposite ends,
   wherein the tape slug removal assembly comprises a slug removal actuator having a leading or other portion operatively adapted for securing the tape slug, and after the tape slug is secured, said slug removal actuator is operatively adapted for moving the portion of the slug removal actuator and the secured tape slug away from the underlying length of the release liner, and,
   wherein said tape slug forming assembly comprises spaced apart cutting blades and a first blade actuating mechanism operatively adapted for moving the cutting blades so as to cut through adhesive tape on the path, without at least one of the cutting blades cutting through the release liner, the portion of the tape slug removal actuator comprises said cutting blades, and said tape slug removal actuator is operatively adapted for moving one of the cutting blades towards the other cutting blade, or moving both of the cutting blades towards each other, so as to secure the tape slug between the cutting blades.

2. The apparatus according to claim 1, wherein said apparatus comprises the path, said tape moving assembly is operatively adapted for moving a length of the liner-backed double-sided adhesive tape along the path and periodically stopping such movement to permit the formation of a tape slug at spaced apart locations along the adhesive tape.

3. The apparatus according to claim 2, wherein said tape slug forming assembly comprises spaced apart cutting blades disposed adjacent to a tape slug forming location on the path and a first blade actuating mechanism operatively adapted for moving the cutting blades toward the tape slug forming location so as to cut through adhesive tape on the path, without at least one of the cutting blades cutting through the release liner.

4. The apparatus according to claim 1, wherein said tape slug removal actuator is operatively adapted for moving the cutting blades away from the underlying length of the release liner, after the cutting blades are moved together, so as to separate the tape slug from the liner-backed double-sided adhesive tape.

5. An apparatus for automatically adhesively bonding a length of release liner-backed double-sided adhesive tape to a substrate, with the liner-backed double-sided adhesive tape comprising an adhesive tape having opposite sides, with each side having a major surface of adhesive, a release liner protecting one major surface of adhesive, and the other major surface of adhesive being exposed, said apparatus comprising:
   a forming apparatus for automatically forming an extended liner tab at a location on, or at multiple spaced apart locations along, the length of liner-backed double-sided adhesive tape, said forming apparatus comprising the apparatus according to claim 1;
   a dispensing assembly for dispensing each length of liner-backed double-sided adhesive tape formed by said forming apparatus; and
   an applying assembly for applying the exposed major surface of adhesive of each dispensed length of liner-backed double-sided adhesive tape so as to adhere to a surface of a substrate, with its release liner and extended liner tab being exposed.

6. An apparatus for adhering a first substrate to second substrate, said apparatus comprising:
   an apparatus for automatically adhesively bonding a length of liner-backed double-sided adhesive tape to a first substrate according to claim 5, with the liner-backed double-sided adhesive tape comprising an adhesive tape having opposite sides, with each side having a major surface of adhesive, a release liner protecting one major surface of adhesive, and the other major surface of adhesive being exposed;
   a pulling assembly for pulling the extended liner tab so as to remove the release liner and expose the underlying major surface of adhesive; and an applying assembly for applying the underlying major surface of adhesive on the first substrate so as to adhere to a surface of a second substrate.

* * * * *